(12) United States Patent
Fukumoto

(10) Patent No.: US 6,781,930 B2
(45) Date of Patent: Aug. 24, 2004

(54) DIFFRACTION GRATING, OPTICAL PICK-UP, ERROR SIGNAL DETECTION DEVICE, AND ERROR SIGNAL DETECTION METHOD

(75) Inventor: Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 09/897,135

(22) Filed: Jul. 3, 2001

(65) Prior Publication Data

US 2002/0018409 A1 Feb. 14, 2002

(30) Foreign Application Priority Data

Jul. 5, 2000 (JP) ........................................ 2000-204275

(51) Int. Cl.⁷ .............................................. G11B 7/095
(52) U.S. Cl. ................... 369/44.32; 369/53.19; 369/44.37; 369/44.41; 369/112.05
(58) Field of Search ........................... 369/44.32, 44.41, 369/44.37, 53.19, 112.05

(56) References Cited

U.S. PATENT DOCUMENTS 4,707,817 A * 11/1987 Yoshio ................... 369/44.32
5,751,680 A * 5/1998 Ishibashi et al. .......... 369/44.32
5,768,232 A * 6/1998 Muramatsu et al. ...... 369/53.35
5,828,634 A * 10/1998 Ohno et al. .............. 369/44.41

* cited by examiner

Primary Examiner—Doris H. To
Assistant Examiner—Jorge L Ortiz-Criado
(74) Attorney, Agent, or Firm—Oblon, Spivak, McClelland, Maier & Neustadt, P.C.

(57) ABSTRACT

An optical pick-up generates a 0-th order diffraction light and ±1st order diffraction lights by a diffraction grating and irradiates the same to an optical disc. The ±1st order diffraction lights have phase distributions equivalent to a wavefront aberration of the optical disc when there is a tilt in the optical disc. Distances between the center of the main optical spot and centers of sub optical spots in a disc radial direction on a recording surface are whole multiples of a track pitch. The generation circuit generates a main push-pull signal corresponding to the 0-th order diffraction light and first and second sub push-pull signals corresponding to the ±1st order diffraction lights and generates tracking error signals TE as differential push-pull signals obtained by subtracting a sum signal of the first and second sub push-pull signals from the main push-pull signal.

27 Claims, 22 Drawing Sheets

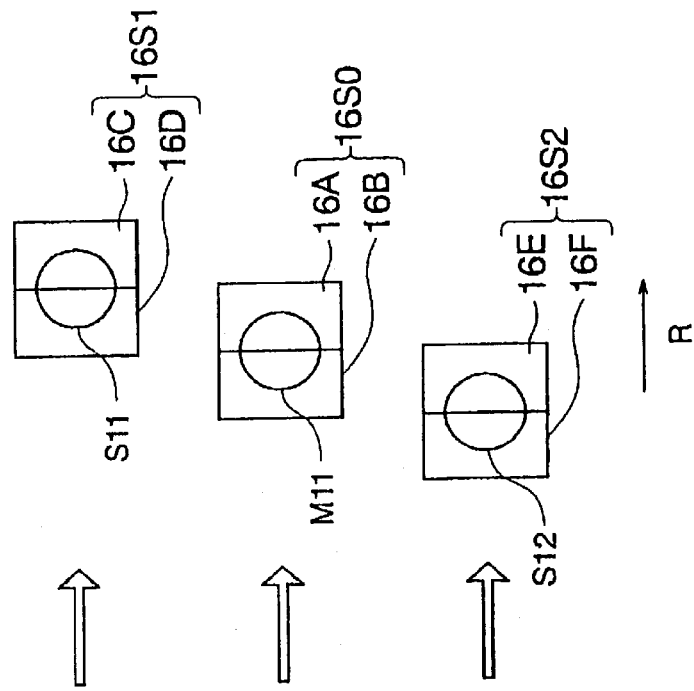
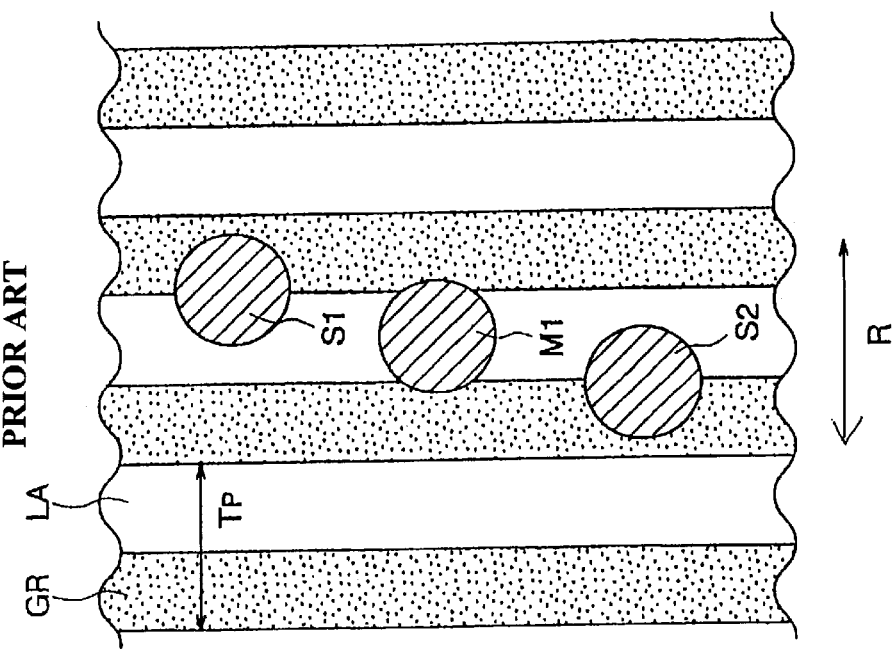

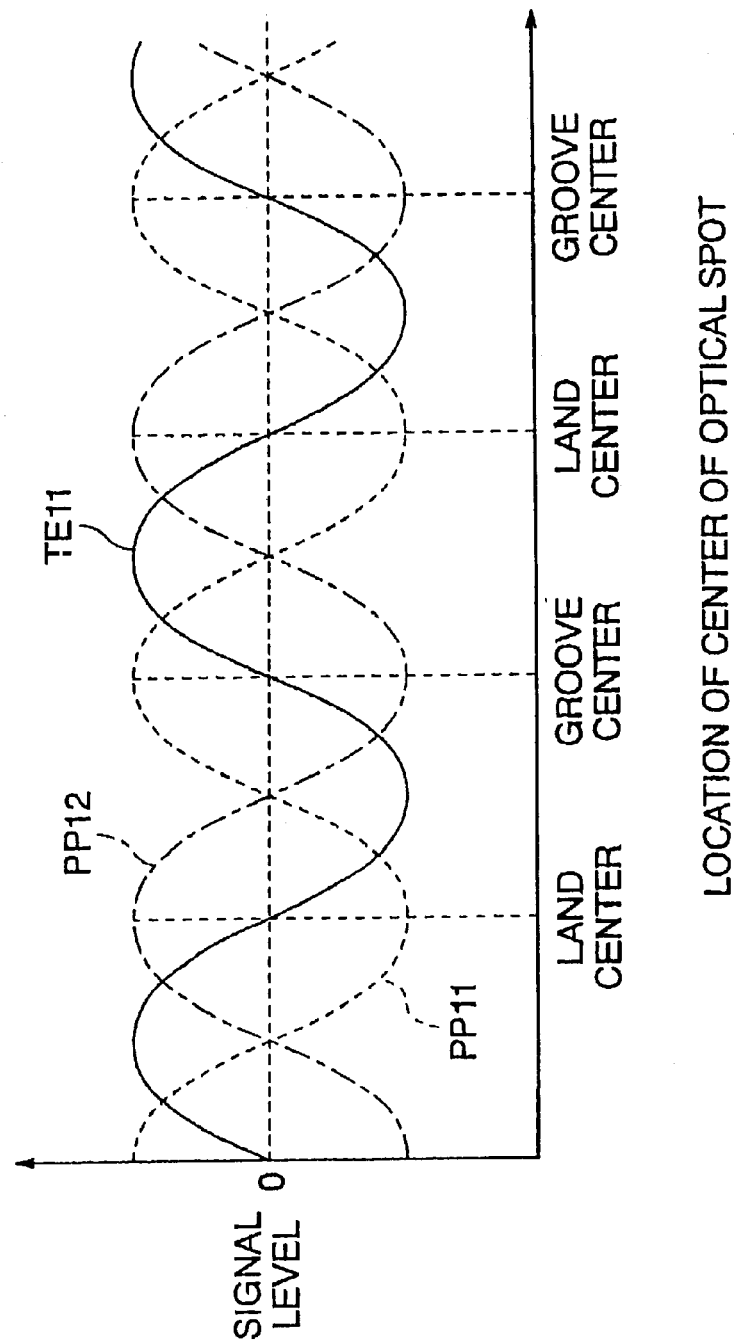

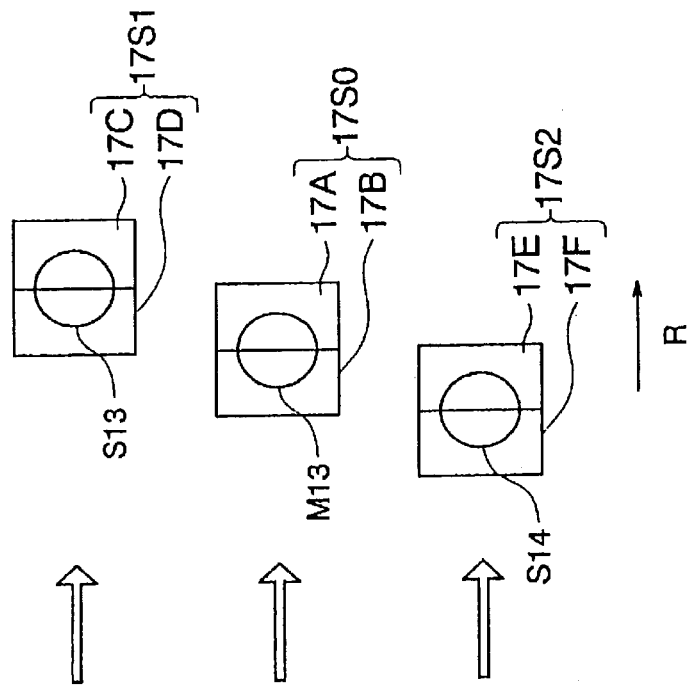
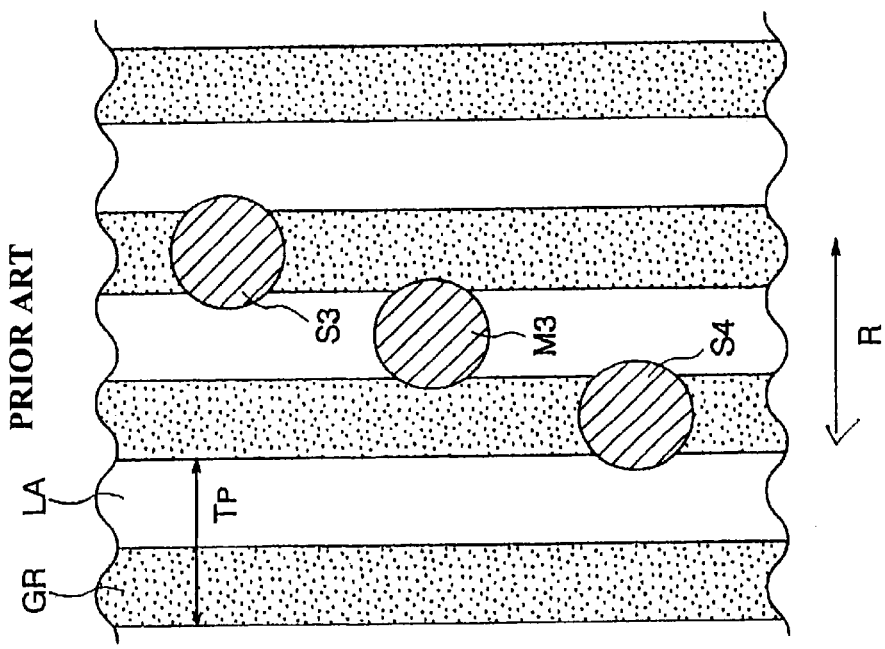

C CROSS SECTION

DIFFRACTION GRATING, OPTICAL PICK-UP, ERROR SIGNAL DETECTION DEVICE, AND ERROR SIGNAL DETECTION METHOD

BACKGROUND OF THE INVENTION

1. Field of the Invention

The present invention relates to a diffraction grating, an optical pick-up for focusing a laser beam passing through the diffraction grating to an optical disc, and an error signal detection device and an error signal detection method for detecting for example a tracking error signal or other error signal.

2. Description of the Related Art

In an optical disc drive, when an optical disc is tilted, a signal quality of a recording signal and/or reproduced signal of the optical disc may be lowered. When correcting this tilt of the optical disc, it is necessary to detect the tilt of the optical disc and generate a signal (tilt error signal) in response to the detected tilt.

U.S. Pat. No. 5,936,923 discloses an optical pick-up having a laser beam source, an object lens, and a liquid crystal panel for correcting aberration, and changing a refractive index of the liquid crystal panel in response to the thickness or tilt angle of the optical disc.

U.S. Pat. No. 5,936,926 also discloses the detection of tilt angle by a tilt sensor and the drive of the liquid crystal panel by a liquid crystal panel control circuit based on the detected tilt angle for changing the refractive index thereof.

When accessing at a predetermined address region on a track of an optical disc by an optical pick-up, it is necessary to generate a track traverse, (cross track) signal. This cross track signal is a signal electrically shifted in phase from a tracking error signal by 90 degrees, and is spatially shifted by exactly ¼ of a pitch of the tracks or track guide grooves.

In order to move an optical spot from the optical pick-up to a predetermined target track, it is necessary to detect a speed of movement and a direction of movement of the optical spot. In an optical disc drive, in order to detect the direction of movement of the optical spot, generally the tracking error signal and the cross track signal are used.

The optical disc drive performs a tracking servo control based on the tracking error signal.

As the method of detection (or method of generation) of the tracking error signal, there are known a one spot push-pull method for generating the signal from an output signal of a photo detector by utilizing one optical spot, a differential pushpull (DPP) method for generating the signal from output signals of the photo detector utilizing three optical spots, and so on.

FIGS. 1A and 1B are views illustrating an enlarged recording surface of an optical disc and a circuit for generating a tracking error signal and other signals. In the optical disc drive, for example, the optical pick-up focuses the laser beam on the recording surface of the optical disc to generate an optical spot M0 and receives the laser beam reflected at the recording surface to generate various signals, such as a track error signal, a focus error signal and an RF signal.

FIG. 1A is a view of the recording surface of an optical disc. Lands LA and grooves GR are formed on the recording surface. The pitch of the lands LA and the pitch of the grooves GR are equal to a track pitch Tp. The center of the optical spot M0 is positioned at the center of the land LA of the recording surface. This optical spot M0 moves in a radial direction R.

FIG. 1B is a view illustrating a circuit for generating a tracking error signal or other signal based on the laser beam reflected at the recording surface (reflected laser beam).

The light receiving portion 15S of a two-divided photo detector receives a laser beam reflected at the recording surface (or the optical spot M0 on the recording surface) whereby an optical spot M10 is formed. The optical spot M10 moves in the direction R corresponding to the radial direction R when the optical spot M0 on the recording surface moves in the radial direction R. The light receiving portion 15S is equally divided into two along a direction corresponding to the track direction and has first and second light reception regions 15A and 15B.

The first light reception region 15A generates a light reception signal S15A in accordance with the laser beam irradiated on the region 15A.

The second light reception region 15B generates a light reception signal S15B in accordance with the laser beam irradiated on the region 15B.

A subtractor 101 generates a tracking error signal TE10 (=S15A−S15B) as the push-pull signal by subtracting the light reception signal S15B from the light reception signal S15A.

An adder 102 generates a sum signal RF10 (=S15A+S15B) by adding the light reception signals S15A and S15B. This sum signal (reproduced signal) RF10 corresponds to the amount of reflected light of the laser beam.

A high pass filter (HPF) 103 generates a cross track signal CT10 by extracting an alternating current component (or high frequency component) of the sum signal RF10.

FIG. 2 is a schematic waveform diagram illustrating the tracking error signal TE10 and the sum signal RF10, generated in the circuit in FIG. 1.

The sum signal RF10 becomes the maximum value when the center of the optical spot M0 is positioned at the center of the land LA and becomes the minimum value when the center of the optical spot M0 is positioned at the center of the groove GR.

By eliminating a direct current component DCr from this sum signal RF10 (for example eliminating the direct current component DCr by extracting the alternating current component by the HPF), the cross track signal CT10 can be obtained.

The tracking error signal TE10 becomes 0 in signal level when the center of the optical spot M0 is positioned at the center of the land LA and when it is positioned at the center of the groove GR, while becomes the maximum value or minimum value when the center of the optical spot M0 is positioned at a border between the land LA and the groove GR.

FIGS. 3A and 3B are views illustrating the recording surface of the optical disc and the light receiving portion of the photo detector when generating the cross track signal. In the optical disc drive, for example, the optical pick-up generates a laser beam comprised of a 0-th order diffraction light and ±1st order diffraction light by a diffraction grating, focuses the laser beams via an object lens to the recording surface of the optical disc to form three optical spots M1, S1, and S2, and receives the laser beams reflected at the recording surface by the photo detector to generate various signals.

FIG. 3A is a view of the recording surface of the optical disc. Lands LA and grooves GR are formed on the recording surface. The pitch of the lands LA and the pitch of the grooves GR are equal to the track pitch Tp. The center of the main optical spot M1 is positioned at the center of the land LA, and the centers of the sub optical spots S1 and S2 are positioned at borders between lands LA and the groove GR. The main optical spot M1 is positioned at the middle of the sub optical spots S1 and S2. The optical spots M1, S1, and S2 move in the radial direction R of the optical disc.

FIG. 3B is a view illustrating light receiving portions of the photo detector receiving the laser beams reflected at the recording surface.

A main light receiving portion 16S0 and sub light receiving portions 16S1 and 16S2 of the photo detector are irradiated with the laser beams reflected at the recording surface, whereby main optical spot M11, first and second sub optical spots S11 and S12 are formed. The optical spots M11, S11, and S12 move in the direction R corresponding to the radial direction R when the optical spots M1, S1, and S2 on the recording surface move in the radial direction R of the optical disc.

The main light receiving portion 16S0 is irradiated with the laser beam reflected at the recording surface of the optical disc (or the main optical spot M1 on the recording surface), whereby the main optical spot M11 is formed. This main light receiving portion 16S0 is equally divided into two along a direction corresponding to the track direction and has first and second light reception regions 16A and 16B. The first light reception region 16A generates a signal in accordance with the laser beam irradiated to the region 16A. The second light reception region 16B generates a signal in accordance with the laser beam irradiated to the region 16B.

The sub light receiving portion 16S1 is irradiated with the laser beam reflected at the recording surface of the optical disc (or the sub optical spot S1 on the recording surface), whereby the sub optical spot S11 is formed. This sub light receiving portion 16S1 is equally divided into two along a direction corresponding to the track direction and has third and fourth light reception regions 16C and 16D. The third light reception region 16C generates a signal in accordance with the laser beam irradiated to the region 16C. The fourth light reception region 16D generates a signal in accordance with the laser beam irradiated to the region 16D.

The sub light receiving portion 16S2 is irradiated with the laser beam reflected at the recording surface of the optical disc (or the sub optical spot S2 on the recording surface), whereby the sub optical spot S12 is formed. This sub light receiving portion 16S2 is equally divided into two along a direction corresponding to the track direction and has fifth and sixth light reception regions 16E and 16F. The fifth light reception region 16E generates a signal in accordance with the laser beam irradiated to the region 16E. The sixth light reception region 16F generates a signal in accordance with the laser beam irradiated to the region 16F.

When output signals of the first to sixth light reception regions 16A to 16F are defined as S16A to S16F, by combining these signals, a sum signal RF11 (=S16A+S16B), a tracking error signal TE11 (=S16A−S16B), a first push-pull signal PP11 (=S16C−S16D), a second push-pull signal PP12 (=S16E−S16F), and a cross track signal CT11 (=PP11−PP12) can be obtained.

FIG. 4 is a schematic waveform diagram illustrating the tracking error signal TE11 and first and second push-pull signals PP11 and PP12 based on the output signals of the light receiving portions 16S0 to 16S2 of FIG. 3B.

The tracking error signal TE11 becomes 0 in signal level when the center of the main optical spot M1 is positioned at the center of a land LA and when it is positioned at the center of a groove GR, while becomes the maximum value or minimum value when the center of the main optical spot M1 is positioned at a border between a land LA and a groove GR.

The first push-pull signal PP11 becomes the minimum value when the center of the main optical spot M1 is positioned at the center of the land LA, while becomes the maximum value when the center of the main optical spot M1 is positioned at the center of the groove GR.

The second push-pull signal PP12 becomes the maximum value when the center of the main optical spot M1 is positioned at the center of the land LA, while becomes the minimum value when the center of the main optical spot M1 is positioned at the center of the groove GR.

FIGS. 5A and 5B are views illustrating the recording surface of an optical disc and the light receiving portions of a photo detector when using the DPP method. In the optical disc drive, for example, the optical pick-up generates a laser beam comprised by the 0-th order diffraction light and the ±1st order diffraction lights by the diffraction grating, focuses the laser beams via the object lens to the recording surface of the optical disc to generate three optical spots M3, S3 and S4, and receives the laser beams reflected at the recording surface at the photo detector to generate various signals. The optical spots M3, S3, and S4 move in the radial direction R or the anti-radial direction of the optical disc.

FIG. 5A is a view of the recording surface of an optical disc. Lands LA and grooves GR are formed on the recording surface. The pitch of the lands LA and the pitch of the grooves GR are equal to the track pitch Tp. The center of the main optical spot M3 is positioned at the center of a land LA, and the centers of the sub optical spots S3 and S4 are positioned at centers of grooves GR. The main optical spot M3 is positioned at the middle of the sub optical spots S3 and S4.

Also, the distances between the center of the main optical spot M3 and centers of the sub optical spots S3 and S4 in the disc radial direction R are values obtained by multiplying a half of the track pitch Tp ($T_p/2$) by an odd number.

By arranging three optical spots M3, S3, and S4 as shown in FIG. 5A, even when the positional relationship between the object lens and the photo detector changes due to the movement of the object lens, a highly precise tracking error can be obtained without regard as to the displacement of the object lens, that is, the location of the optical spot on the photo detector.

FIG. 5B is a view illustrating the light receiving portions of a photo detector for receiving laser beams reflected at the recording surface.

The laser beams reflected at the recording surface are supplied to light receiving portions 17S0 to 17S2 of the photo detector to thereby generate optical spots M13, S13, and S14. The optical spots M13, S13, and S14 move in the direction R' corresponding to the radial direction R when the optical spots M3, S3, and S4 on the recording surface move in the radial direction R of the optical disc.

The main light receiving portion 17S0 is irradiated by the laser beam reflected at the recording surface of the optical disc (or the main optical spot M3 on the recording surface), whereby the main optical spot M13 is formed. This main light receiving portion 17S0 is equally divided into two along a direction corresponding to the track direction and has first and second light reception regions 17A and 17B. The first light reception region 17A generates a signal in accordance with the laser beam irradiated to the region 17A. The second light reception region 17B generates a signal in accordance with the laser beam irradiated to the region 17B.

The sub light receiving portion 17S1 is irradiates by a laser beam reflected at the recording surface of the optical disc (or the sub optical spot S3 on the recording surface), whereby the sub optical spot S13 is formed. This sub light receiving portion 17S1 is equally divided into two along a direction corresponding to the track direction and has third and fourth light reception regions 17C and 17D. The third light reception region 17C generates a signal in accordance with the laser beam irradiated to the region 17C. The fourth light reception region 17D generates a signal in accordance with the laser beam irradiated to the region 17D.

The sub light receiving portion 17S2 is irradiated by the laser beam reflected at the recording surface of the optical disc (or the sub optical spot S4), whereby the sub optical spot S14 is formed. This sub light receiving portion 17S2 is equally divided into two along a direction corresponding to the track direction and has fifth and sixth light reception regions 17E and 17F. The fifth light reception region 17E generates a signal in accordance with the laser beam irradiated to the region 17E. The sixth light reception region 17F generates a signal in accordance with the laser beam irradiated to the region 17F.

When output signals of the first to sixth light reception regions 17A to 17F are defined as S17A to S17F, a tracking error signal TE13 as in the following equation can be obtained by the DPP method. Note that, a coefficient k takes the value in accordance with the ratio of the amount of light between the main optical spot M13 and the sub optical spots S13 and S14.

$$TE13 = S17A - S17B - k(S17C - S17D + S17E - S17F)$$

Summarizing the disadvantages to be solved by the present invention, in the optical pick-up of U.S. Pat. No. 5,936,923, there is a restriction on the location for providing the tilt sensor. Further, the position at which the laser beam is focused on the optical disc and the position for detecting the tilt by the tilt sensor are different, so it is difficult to correctly detect the tilt of the optical disc.

In recent years, for the purpose of raising the density of the optical disc, a land-groove recording method may be used. In this recording method, a signal is recorded in both of the lands and grooves on an optical disc having a ratio of widths of the lands and grooves of 1:1. In such an optical disc, the high frequency component of the sum signal is small, so it is difficult to detect the cross track signal from the sum signal.

The DPP method is excellent as a method of detection of tracking error. With the conventional DPP method, however, it is difficult to detect the tilt error signal together with the tracking error signal.

Also, when the centers of the three optical spots (one main optical spot and two sub optical spots) are positioned at the centers of lands or when the centers of the three optical spots are positioned at the centers of grooves, if the phase of the push-pull signal of the main optical spot and the phase of the sum signal of the push-pull signals of the sub optical spots are identical, tracking error signals comprised by differential push-pull signals cannot be obtained.

SUMMARY OF THE INVENTION

An object of the present invention is to provide an error signal detection device and an error signal detection method for detecting tracking error signals comprised by differential push-pull signals, an optical pick-up useable in the error signal detection device, and a diffraction grating useable in this optical pick-up.

Another object of the present invention is to provide an error signal detection device and an error signal detection method for detecting tracking error signals comprised by differential push-pull signals and a tilt error signal.

According to a first aspect of the present invention, there is provided a diffraction grating for generating a 0-th order diffraction light and ±1st order diffraction lights to be irradiated on a recording surface of an optical disc by diffracting a laser beam, wherein each of said ±1st order diffraction lights irradiated to said optical disc has a phase distribution equivalent or substantially equivalent to a wavefront aberration of said optical disc when there is a tilt in said optical disc, distances between a main optical spot corresponding to said 0-th order diffraction light and sub optical spots corresponding to said ±1st order diffraction lights in a disc radial direction at said recording surface are identical or substantially identical to a whole multiple of a pitch of tracks or track guide grooves of said optical disc, and a phase of a push-pull signal of said 0-th order diffraction light and a phase of a sum signal of the push-pull signals of said ±1st order diffraction lights are different from each other.

Preferably, said main optical spot and said sub optical spots are formed on an identical track of said recording surface.

Preferably, one of said ±1st order diffraction lights has a phase distribution equivalent or substantially equivalent to the wavefront aberration in a case when a tilt angle of said optical disc is a positive constant angle, and the other of said ±1st order diffraction lights has a phase distribution equivalent or substantially equivalent to the wavefront aberration in a case when the tilt angle of said optical disc is a negative constant angle.

In the diffraction grating according to the present invention, for example, said wavefront aberration may be coma occurring at a transparent substrate of said optical disc.

In the diffraction grating according to the present invention, for example, said optical disc has an address region with pits indicating the address formed therein and a data region with lands and grooves formed therein. Said pits and said lands may be arranged on the tracks of said recording surface.

According to a second aspect of the present invention, there is provided an optical pick-up comprising a laser for outputting a laser beam, a diffraction grating for generating a 0-th order diffraction light and ±1st order diffraction lights by diffracting the laser beam from said laser, an object lens for focusing said 0-th order diffraction light and ±1st order diffraction lights and irradiating the same to the recording surface of the optical disc to form a main optical spot corresponding to said 0-th order diffraction light and sub optical spots corresponding to said ±1st order diffraction lights on said recording surface, and a photo detector provided with a main light receiving portion for receiving said 0-th order diffraction light reflected at said recording surface and sub light receiving portions for receiving said ±1st order diffraction lights reflected at said recording surface, wherein each of said ±1st order diffraction lights irradiated to said optical disc has a phase distribution equivalent or substantially equivalent to a wavefront aberration of said optical disc when there is a tilt in said optical disc, distances between the center of said main optical spot and centers of said sub optical spots in a disc radial direction on said recording surface are identical or substantially identical to a whole multiple of a pitch of tracks or track guide grooves, and the phase of a push-pull signal of said 0-th order diffraction light based on the output signal of said main light receiving portion and the phase of the sum signal of the push-pull signals of said ±1st order diffraction lights based on the output signals of said sub light receiving portions are different from each other.

Preferably, said main optical spot and said sub optical spots are formed on the identical track of said recording surface.

Preferably, one of said ±1st order diffraction lights has a phase distribution equivalent or substantially equivalent to the wavefront aberration when the tilt angle of said optical disc is a positive constant angle, and the other of said ±1st order diffraction lights has a phase distribution equivalent or substantially equivalent to the wavefront aberration when the tilt angle of said optical disc is a negative constant angle.

In the optical pick-up according to the present invention, for example, said wavefront aberration is coma occurring at a transparent substrate of said optical disc, and said main light receiving portion and sub light receiving portions are configured divided along a direction corresponding to the radial direction of said optical disc.

In the optical pick-up according to the present invention, for example, said optical disc has an address region with pits indicating the address formed therein and a data region with lands and grooves formed therein. Said pits and said lands can be arranged on the track of said recording surface.

According to a third aspect of the present invention, there is provided an error signal detection device comprising a laser for outputting a laser beam, a diffraction grating for generating a 0-th order diffraction light and ±1st order diffraction lights by diffracting the laser beam from said laser, an object lens for focusing said 0-th order diffraction light and ±1st order diffraction lights and irradiating the same to the recording surface of the optical disc to form a main optical spot corresponding to said 0-th order diffraction light and sub optical spots corresponding to said ±1st order diffraction lights on said recording surface, a photo detector provided with a main light receiving portion for receiving said 0-th order diffraction light reflected at said recording surface and sub light receiving portions for receiving said ±1st order diffraction lights reflected at said recording surface, and a generation circuit for generating a main push-pull signal corresponding to said 0-th order diffraction light and first and second sub push-pull signals corresponding to said ±1st order diffraction lights based on output signals of said photo detector and generating tracking error signals as differential push-pull signals obtained by subtracting a sum signal of said first and second push-pull signals from said main push-pull signal, wherein each of said ±1st order diffraction lights irradiated to said optical disc has a phase distribution equivalent or substantially equivalent to a wavefront aberration of said optical disc when there is a tilt in said optical disc, distances between the center of said main optical spot and centers of said sub optical spots in a disc radial direction on said recording surface are identical or substantially identical to a whole multiple of a pitch of tracks or track guide grooves, and the phase of said push-pull signal and the phase of the sum signal of said first and second sub push-pull signals are different from each other.

Preferably the device further has a tilt detection circuit for generating a tilt error signal corresponding to a tilt of said optical disc, said generation circuit generates a main reproduced signal corresponding to an amount of reflected light of said 0-th order diffraction light and first and second sub reproduced signals corresponding to amounts of reflected light of said ±1st order diffraction lights based on output signals of said photo detector, and said tilt detection circuit generates said tilt error signal based on a difference of amplitudes of alternating current components of said first and second sub reproduced signals.

More preferably, said tilt detection circuit comprises a first high pass filter for extracting the alternating current component of said first sub reproduced signal, a first envelope detector for detecting the envelope of the signal extracted by said first high pass filter, a second high pass filter for extracting the alternating current component of said second sub reproduced signal, a second envelope detector for detecting the envelope of the signal extracted by said second high pass filter, and a subtractor for generating said tilt error signal based on a difference of amplitudes of output signals of said first and second envelope detectors.

More preferably, said tilt detection circuit further has a first low pass filter for extracting a direct current component of said first sub reproduction signal, a first divider for dividing the amplitude of the output signal of said first envelope detector by the direct current component extracted by said first low pass filter, a second low pass filter for extracting the direct current component of said second sub reproduction signal, and a second divider for dividing the amplitude of the output signal of said second envelope detector by the direct current component extracted by said second low pass filter, and said subtractor generates said tilt error signal based on the difference of the output signals of said first and second dividers.

Preferably, said optical disc has an address region with pits indicating an address formed therein and a data region with lands and grooves formed therein, said pits and said lands are arranged on the track of said recording surface, said generation circuit detects said tracking error signal of said data region, and said tilt detection circuit detects said tilt error signal of said address region.

Preferably, the width of said lands and the width of said grooves are identical or substantially identical.

Preferably, said generation circuit generates a cross track signal based on the difference between said first and second sub push-pull signals.

Preferably, said main optical spot and said sub optical spots are formed on the identical track of said recording surface.

Preferably, one of said ±1st order diffraction lights has a phase distribution equivalent or substantially equivalent to the wavefront aberration in the case when the tilt angle of said optical disc is a positive constant angle, and the other of said ±1st order diffraction lights has a phase distribution equivalent or substantially equivalent to the wavefront aberration in the case when the tilt angle of said optical disc is a negative constant angle.

In the error signal detection device according to the present invention, for example, said wavefront aberration is coma occurring at the transparent substrate of said optical disc, and said main light receiving portion and sub light receiving portions are configured divided along a direction corresponding to the radial direction of said optical disc.

According to a fourth aspect of the present invention, there is provided an error signal detection method comprised of a step of generating a 0-th order diffraction light and ±1st order diffraction lights by diffracting a laser beam and irradiating the generated 0-th order diffraction light and ±1st order diffraction lights to a track of a recording surface of the optical disc, a step of generating a main push-pull signal corresponding to said 0-th order diffraction light reflected at said recording surface and first and second sub push-pull signals corresponding to said ±1st order diffraction lights reflected at said recording surface, and a step of generating a tracking error signal as a differential push-pull signal obtained by subtracting a sum signal of said first and second sub push-pull signals from said main push-pull signal, wherein each of said ±1st order diffraction lights irradiated to said optical disc has a phase distribution equivalent or substantially equivalent to a wavefront aberration of said optical disc when there is a tilt in said optical disc, distances between the center of said main optical spot and centers of said sub optical spots in a disc radial direction on said recording surface are identical or substantially identical to a whole multiple of a pitch of tracks or track guide grooves, and the phase of said push-pull signal and the phase of the sum signal of said first and second sub push-pull signals are different from each other.

The error signal detection method according to the present invention is preferably further comprising a step of generating a main reproduced signal corresponding to an amount of reflected light of said 0-th order diffraction light reflected at said recording surface and first and second sub reproduced signals corresponding to amounts of reflected light of said ±1st order diffraction lights reflected at said recording surface and a step of generating a tilt error signal corresponding to a tilt of said optical disc based on a difference of amplitudes of alternating current components of said first and second sub reproduced signals.

Preferably, said optical disc has an address region with pits indicating the address formed therein and a data region with lands and grooves formed therein, said pits and said lands are arranged on tracks of said recording surface, and in the step of generating said tracking error signal, said tracking error signal of said data region is generated, and in the step of generating said tilt error signal, said tilt error signal of said address region is generated.

Preferably, the width of said lands and the width of said grooves are identical or substantially identical.

The error signal detection method according to the present invention is preferably further comprised by a step of generating a cross track signal based on a difference between said first and second sub push-pull signals.

Preferably, in said step of irradiation, the main optical spot corresponding to said 0-th order diffraction light and the sub optical spots corresponding to said ±1st order diffraction lights are formed on the identical track of said recording surface.

Preferably, one of said ±1st order diffraction lights has a phase distribution equivalent or substantially equivalent to the wavefront aberration when the tilt angle of said optical disc is a positive constant angle, and the other of said ±1st order diffraction lights has a phase distribution equivalent or substantially equivalent to the wavefront aberration when the tilt angle of said optical disc is a negative constant angle.

Preferably, the ±1st order diffraction lights generated by the diffraction grating have phase distributions equivalent or substantially equivalent to the wavefront aberration of the optical disc when there is a tilt in the optical disc.

Distances between the center of the main optical spot and the centers of the sub optical spots in the disc radial direction at the recording surface of the optical disc are set at whole multiples of the track pitch or whole multiples of the pitch of the track guide grooves. Also, the phase of the push-pull signal of said 0-th order diffraction light and the phase of the sum signal of the push-pull signals of said ±1st order diffraction lights are different from each other. Accordingly, it is possible to obtain a tracking error signal comprised by the differential push-pull signals.

The magnitude of the amplitude of the alternating current component of the first sub reproduced signal corresponding to the amount of the reflected light of one of the ±1st order diffraction lights becomes the maximum when there is a predetermined tilt angle (+θ) and monotonously becomes smaller the further from the related tilt angle (+θ).

The magnitude of the amplitude of the alternating current component of the second sub reproduced signal corresponding to the amount of reflected light of one of the ±1st order diffraction lights becomes the maximum when there is a predetermined tilt angle (−θ) and monotonously becomes smaller the further from the related tilt angle (−θ).

The difference of amplitudes of the alternating current components of these sub reproduced signals corresponds to the tilt angle of the optical disc. The tilt error signal can be detected based on the related difference of amplitude. Also, even in the case where the tilt angle of the optical disc is near 0 degree, the tilt angle can be correctly detected, and the detection precision of the tilt of the optical disc can be improved.

BRIEF DESCRIPTION OF THE DRAWINGS

These and other objects and features of the present invention will become clearer from the following description of the preferred embodiments given with reference to the accompanying figures, in which:

FIGS. 3A and 3B are views illustrating a recording surface of an optical disc and a light receiving portion of a photo detector when a cross track signal is generated;

FIG. 4 is a schematic waveform diagram illustrating a tracking error signal and push-pull signals based on output signals of light receiving portions of FIG. 3A;

FIGS. 5A and 5B are views illustrating the recording surface of the optical disc and the light receiving portions of the photo detector when a DPP method is used;

DESCRIPTION OF THE PREFERRED EMBODIMENTS

Preferred embodiments of the present invention will be described with reference to the accompanying drawings.

An optical disc drive generally has an optical pick-up. It focuses a laser beam output from a semiconductor laser in the optical pick-up and irradiates the same to a track of the optical disc.

Figure 1B:
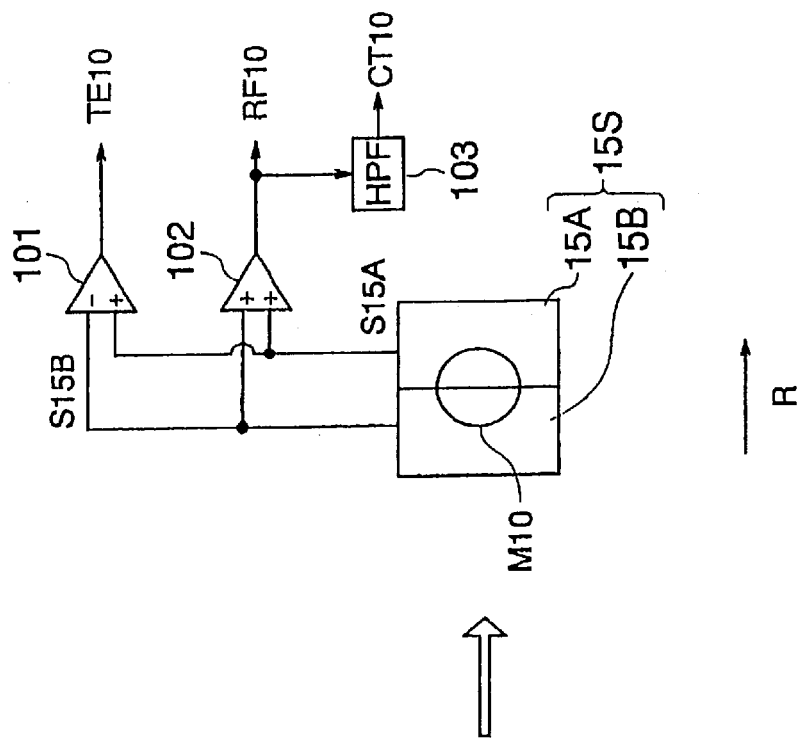
FIGS. 1A and 1B are views illustrating a recording surface of an optical disc and a circuit for generating a tracking error signal and other signals.
Figure 1A:
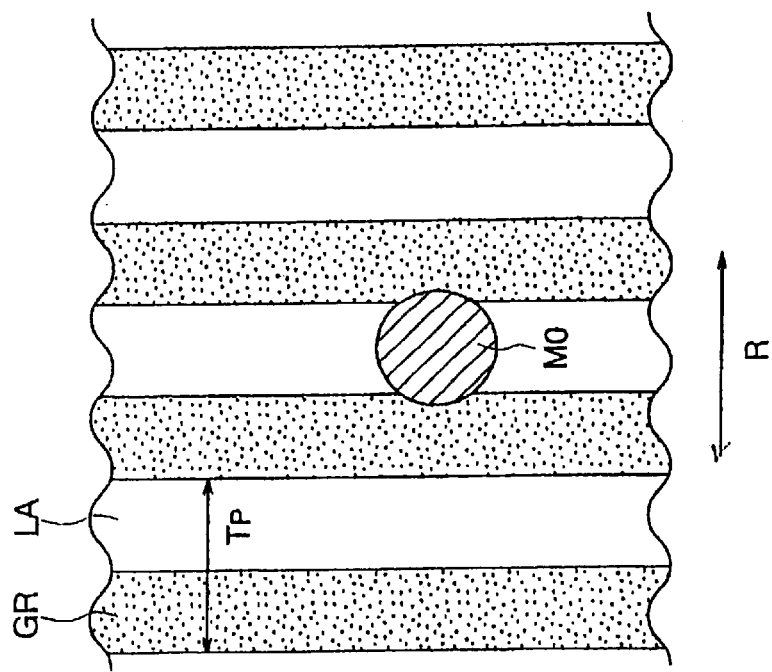
Figure 2:
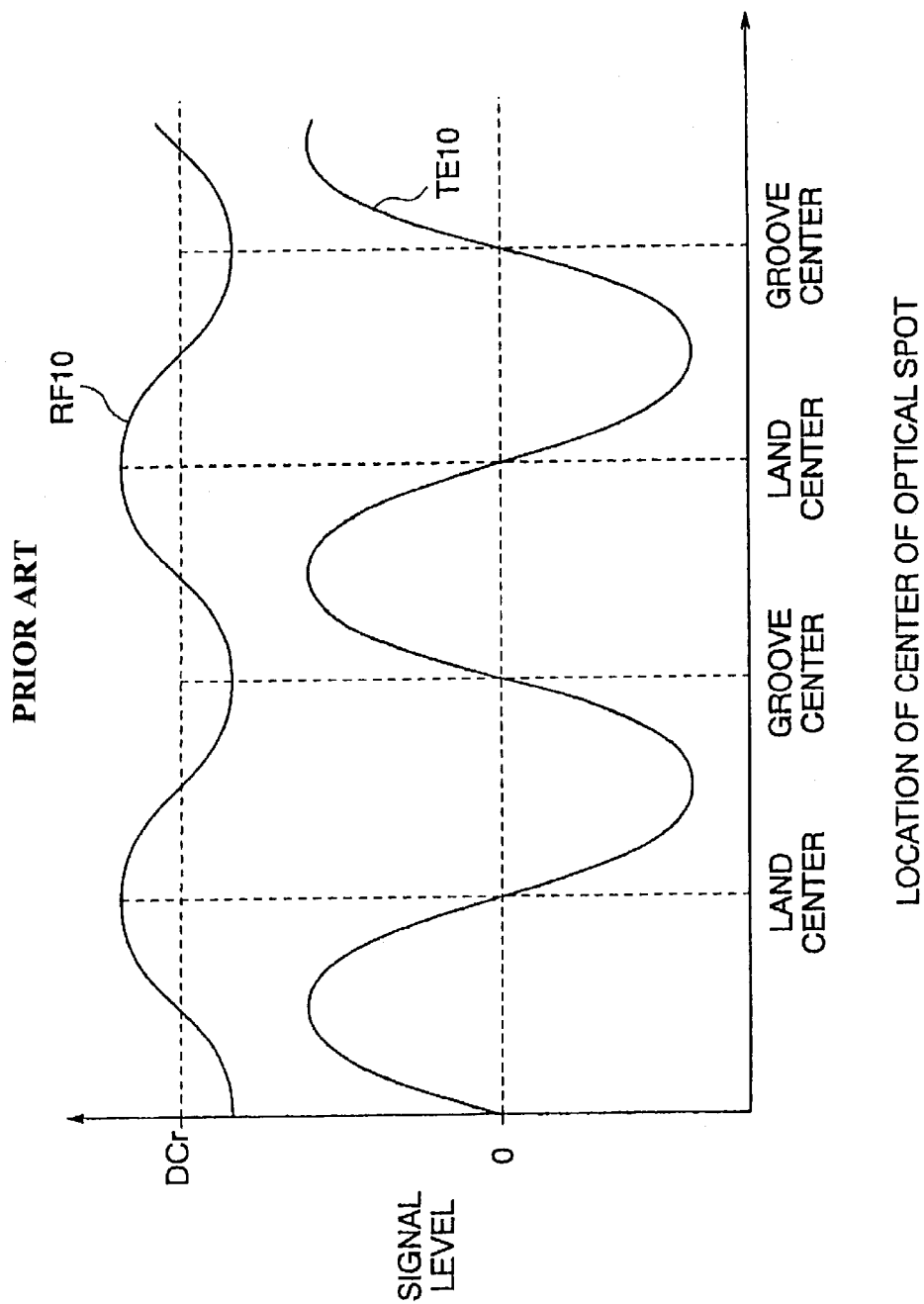
FIG. 2 is a schematic waveform diagram illustrating a tracking error signal and a reproduced signal in FIG. 1.
Figure 6A:
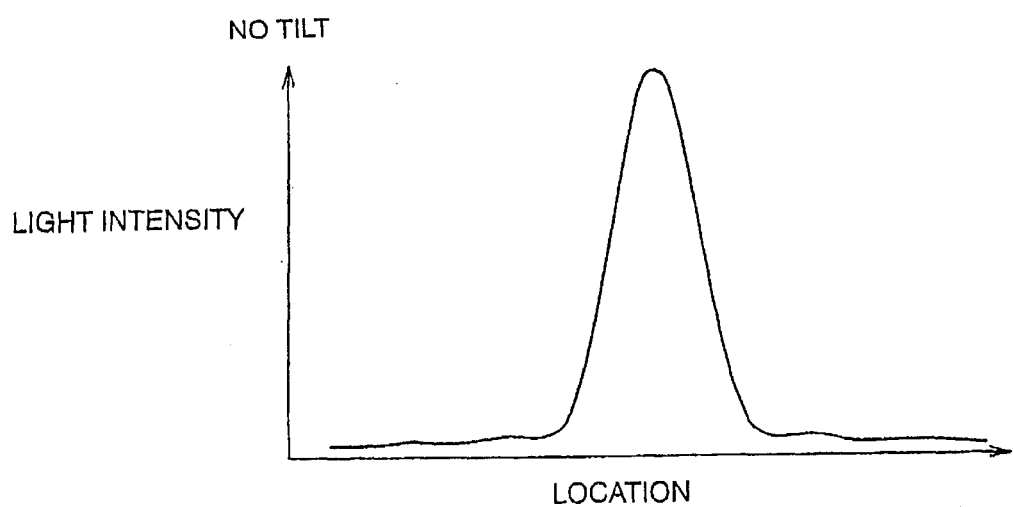
FIGS. 6A and 6B are views illustrating relationships between a light intensity and location of an optical spot formed on an optical disc.
Figure 6B:
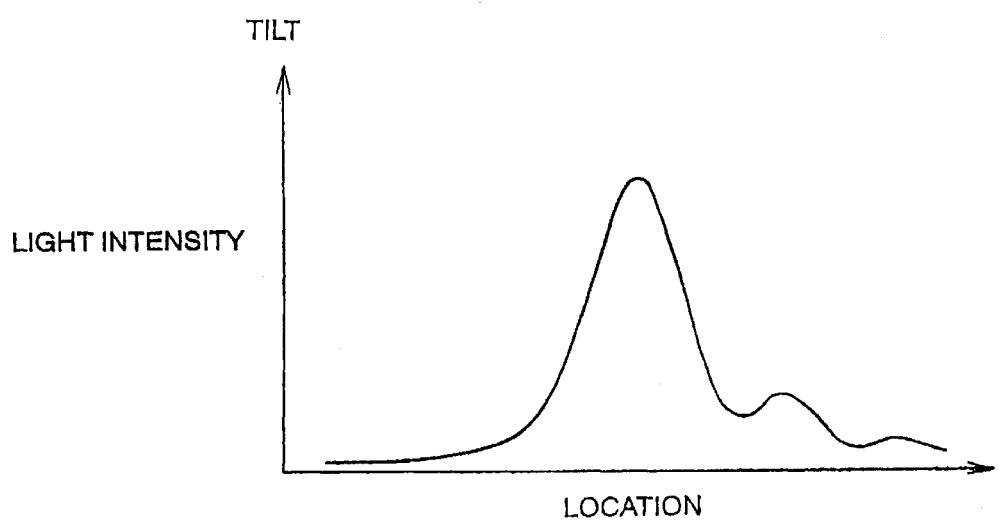

FIGS. 6A and 6B are views illustrating relationships between a light intensity and location of an optical spot formed on the optical disc. FIG. 6A is a view illustrating the relationship between the light intensity and the location when there is no tilt in the optical disc. FIG. 6B is a view illustrating the relationship between the light intensity and the location when there is a tilt in the optical disc.

When there is a tilt in the optical disc, the light intensity of the center of the optical spot may be lowered, and a side lobe may be generated in the tilt direction. Also, due to the lowering of the center intensity of the optical spot, the amplitude of the reproduced signal corresponding to the amount of reflected light may be reduced and the signal quality may be lowered.

This is because when the laser beam strikes the transparent substrate (disc substrate) of the tilted optical disc, a spatial phase distribution, for example, a phase distribution due to the wavefront aberration, occurs in the laser beam until it passes through the transparent substrate and reaches the recording surface, so the focusing performances of the optical spots formed on the recording surface are lowered.

By imparting a phase distribution equivalent or substantially equivalent to the wavefront aberration occurring on the disc substrate to the laser beam before striking the optical disc in advance, various advantages are created as will be mentioned later.

Then, a diffraction grating is used in order to impart a phase distribution equivalent or substantially equivalent to the wavefront aberration occurring due to the tilt of the optical disc in the radial direction to the laser beam before striking the optical disc.

In the related optical pick-up, the 0-th order diffraction light and the ±1st order diffraction lights generated by the laser beam passing through the diffraction grating with linear grooves formed therein have uniform or substantially uniform phase distributions with respect to an advance direction. The 0-th order diffraction light and the ±1st order diffraction lights simultaneously form one main optical spot and two sub optical spots on the optical disc through the object lens.

Note, by forming the diffraction grating with a predetermined pattern, the 0-th order diffraction light is given a uniform phase distribution, and the ±1st order diffraction lights can be given spatial phase distributions occurring when passing through the disc substrate tilted positive or negative. As a result, via the object lens, it is possible to simultaneously form one main optical spot for the case where there is no tilt in the optical disc and two sub optical spots equivalent or substantially equivalent to the case where there are positive and negative tilts in the optical disc on the optical disc.

Here, the interference strip pattern formed on a screen by the laser beam having a uniform phase distribution perpendicularly striking the screen and the laser beams striking the screen with a predetermined angle and orientation with respect to this laser beam having a uniform phase distribution and having spatial phase distributions occurring when passing through the disc substrate tilted positive or negative is found by a computer by applying a computer hologram technique.

Note that, the angles and orientations exhibited by the two laser beams are made to register with the angle and orientation exhibited by the 0-th order diffraction light and ±1st order diffraction lights after passing through the diffraction grating in the case where the diffraction grating is used mounted on an optical pick-up.

First, the phase distribution of the laser beam passed through the tilted disc substrate is expressed by an equation. As the equation, a description by polynomial development of the wavefront aberration is used.

According to the polynomial development of the wavefront aberration, in the wavefront aberration occurring due to the tilted transparent substrate, coma is dominant. When this coma Wc is expressed by orthogonal coordinates (x,y) standardized by a pupil radius on a pupil face of the object lens while setting x as the location in the disc radial direction, the following equation (1) is obtained.

$$Wc(x,y)=2\pi W_{11}x+2\pi W_{31}x(x^2+y^2)+2\pi W_{51}x(x^2+y^2)^2 \tag{1}$$

In equation (1), $W_{11}$ is the wavefront coefficient for determining the position of an optical spot formed on the optical disc. It does not exert any influence upon the shape of the optical spot, so it is possible to select any value.

Also, $W_{31}$ and $W_{51}$ are coma coefficients $W_{31}(\lambda)$ and $W_{51}(\lambda)$ standardized by the laser beam wavelength $\lambda$ and expressed by the following equations (2) and (3):

$$W_{31}(\lambda)=\{(n^2-1)n^2tNA^3\sin\theta\cos\theta\}/\{2\lambda(n^2-\sin^2\theta)^{5/2}\} \tag{2}$$

$$W_{51}(\lambda)=\{(n^2-1)n^2tNA^5(n^4+3n^2\cos^2\theta-5n^2\sin^2\theta+4\sin^2\theta-\sin^4\theta)\sin\theta\cos\theta\}/\{8\lambda(n^2-\sin^2\theta)^{9/2}\} \tag{3}$$

In equations (2) and (3), NA is a numerical aperture of the object lens, $\lambda$ is the laser wavelength from the laser beam source, n is a refractive index of the disc substrate, t is a thickness of the disc substrate, and $\theta$ is the tilt angle indicating the tilt of the disc substrate. The material of the disk substrate is made for example polycarbonate. The refractive index thereof is about 1.5.

When expressing a phase distribution Wd of a laser beam striking while being tilted by exactly an orientation $\beta$ and an angle $\alpha$ with respect to a laser beam having a uniform phase by the orthogonal coordinates (x,y) standardized by a pupil radius r on the pupil face of the object lens when the location in the disc radial direction is x, it becomes as in the following equation (4). Note that, the orientation $\beta$ is set at 0 degree in the case of the radial direction (or x direction) and set at 90 degrees in the case of the track direction.

$$Wd(x,y) = \{2nr(x \cos \beta + y \sin \beta) \sin \alpha\}/\lambda \tag{4}$$

From the above, the interference strip pattern generated by a laser beam having the phase distribution {Wc(x,y)+Wd(x,y)} when θ has a desired value and the laser beam having a uniform phase distribution perpendicularly striking the screen is computed.

Figure 7:
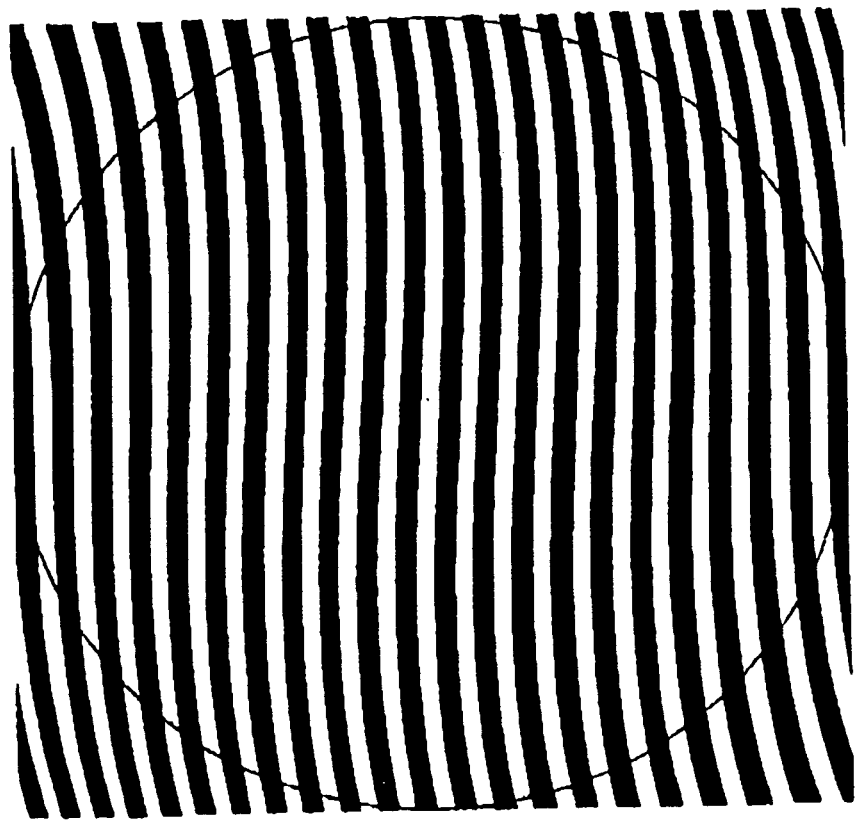
FIG. 7 is a view illustrating an interference pattern computed by using a computer hologram technique.

FIG. 7 is a view illustrating an interference strip pattern computed when θ=1.0 degree, α=0.2 degree, and β=90 degrees. Note that, NA=0.6, λ=650 nm, t=0.6 mm, n=1.5, r=2 mm, and $W_{11} = -2W_{31}/3 - W_{51}/2$. Also, a ring in the figure corresponds to the incident pupil of the object lens.

A desired diffraction grating can be obtained by preparing a photo mask with this interference strip pattern as bright and dark binary information (bright and dark ratio of 1:1) and going through a process of preparing the grating on a glass substrate by using the prepared photo mask.

Figure 8A:
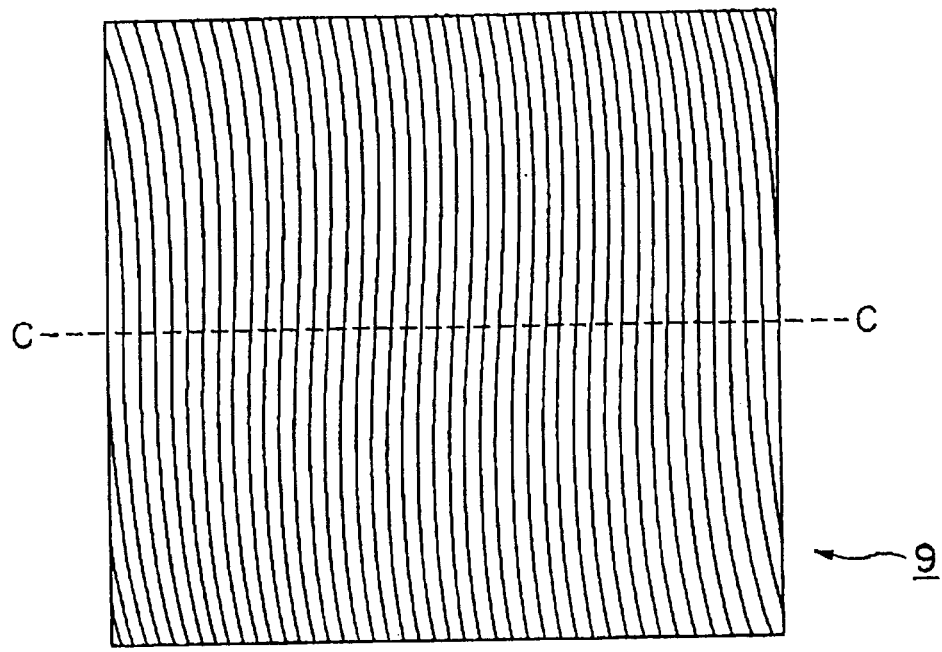
FIGS. 8A and 8B are views of the configuration illustrating a diffraction grating prepared based on the interference pattern of FIG. 7.
Figure 8B:
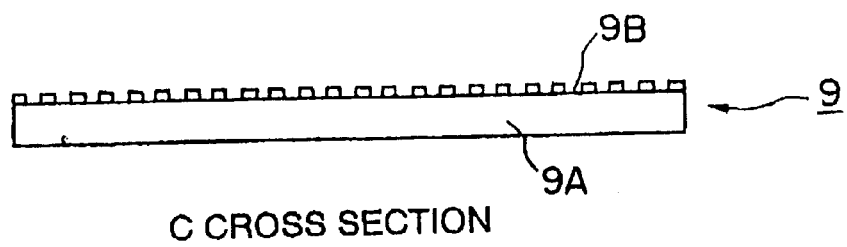

FIGS. 8A and 8B are views of the configuration illustrating the diffraction grating prepared based on the interference pattern of FIG. 7. FIG. 8A is a top view of the diffraction grating 9, and FIG. 8B is a sectional view when the diffraction grating 9 is cut by a line C.

In the diffraction grating 9, wave-like grooves 9B are formed in a glass substrate 9A. The depth of the grooves 9B is determined according to the ratio of the amount of light of the 0-th order diffraction light and the ±1st order diffraction lights.

The laser beams passing through the diffraction grating 9 prepared as described above pass through the object lens and form three optical spots on the optical disc.

The 0-th order diffraction light corresponds to the case when there is no tilt in the optical disc, one of the ±1st order diffraction lights forms an optical spot equivalent or substantially equivalent to the case when there is a positive tilt angle θ in the disc radial direction, and the other of the ±1st order diffraction lights forms an optical spot equivalent or substantially equivalent to the case when there is a negative tilt angle θ (−θ) in the disc radial direction.

Figure 9:
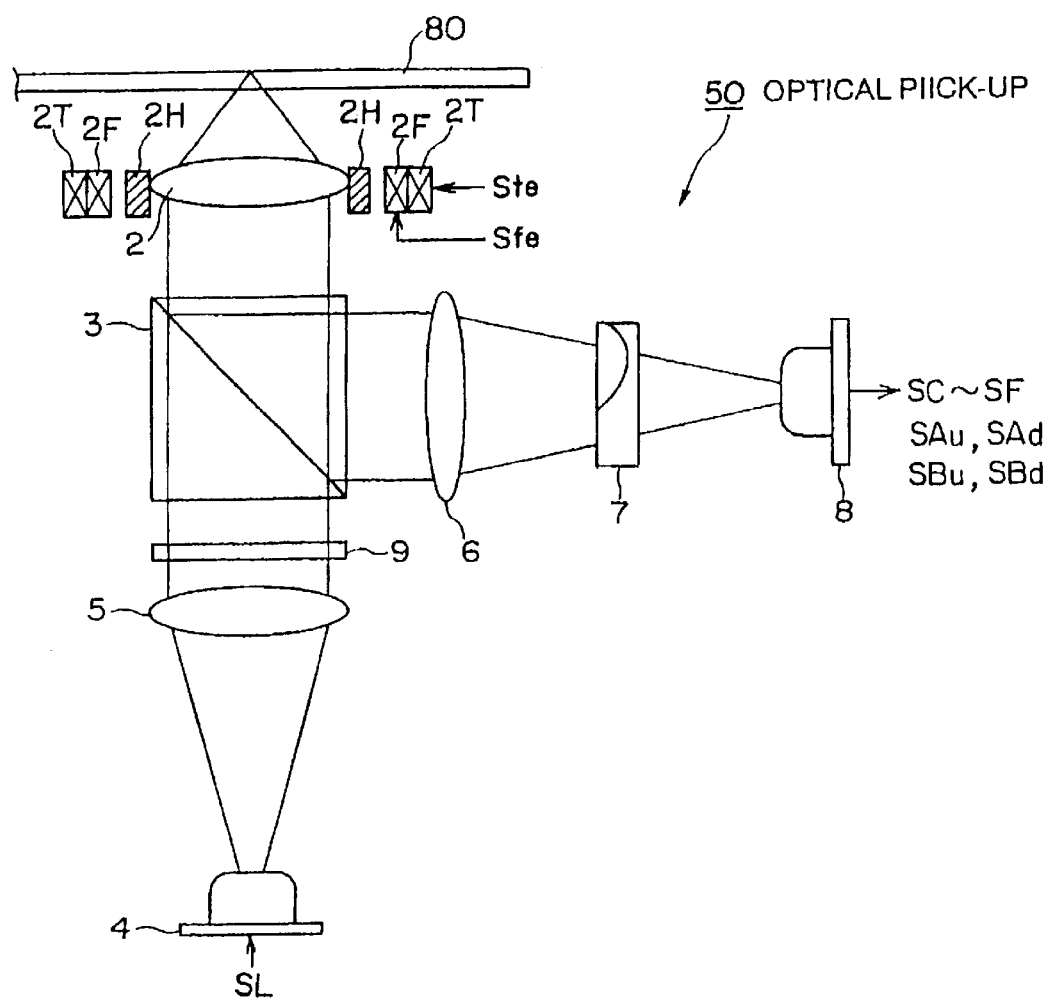
FIG. 9 is a schematic view of the configuration of an optical pick-up having a diffraction grating 9 of FIG. 8.

FIG. 9 is a schematic view of the configuration of an optical pick-up having the diffraction grating 9.

This optical pick-up 50 has a semiconductor laser 4, collimator lens 5, diffraction grating 9, beam splitter 3, object lens 2, focus lens 6, cylindrical lens 7, photo detector 8, lens holder 2H, focusing actuator 2F, and tracking actuator 2T.

The object lens 2 is held at the lens holder 2H.

The focusing actuator 2F moves the lens holder 2H in a focus direction vertical to the recording surface of an optical disc 80 based on a drive signal Sfe and, as a result, moves the object lens 2 in the focus direction. In this way, focus servo control is realized.

The tracking actuator 2T drives the movement of the lens holder 2H in the radial direction of the optical disc 80 based on a drive signal Ste, and as a result, moves the object 2 in the radial direction of the optical disc 80. In this way, tracking servo control is realized.

The semiconductor laser 4 outputs a linearly polarized laser beam based on a drive signal SL and supplies this to the collimator lens 5.

The collimator lens 5 collimates the laser beam from the semiconductor laser 4 and supplies the same to the diffraction grating 9.

The diffraction grating 9 splits the laser beam from the collimator lens 5 to the main laser beam comprised by the 0-th order diffraction light and the first and second sub laser beams comprised by the ±1st order diffraction lights and supplies these laser beams (main laser beam and first and second sub laser beams) to the beam splitter 3.

The beam splitter 3 allows the laser beams from the diffraction grating 9 to pass therethrough and supplies the same to the object lens 2.

The object lens 2 focuses the laser beams from the beam splitter 3 and supplies the same to a track of the optical disc 80 having the lands and/or grooves. The optical disc 80 is comprised by for example a compact disc (CD), digital versatile disc (DVD), or a phase changing type optical disc (PD).

Also, the object lens 2 returns the laser beam reflected at the optical disc 80 to the beam splitter 3.

The beam splitter 3 is struck by the laser beam from the object 2 and reflects and emits the incident laser beam and supplies the same to the focus lens 6.

The focus lens 6 focuses the laser beams from the beam splitter 3 and supplies the same to the cylindrical lens 7.

The cylindrical lens 7 allows the laser beam from the focus lens 6 to pass therethrough and supplies the same to the photo detector 8.

The photo detector 8 receives the laser beam from the cylindrical lens 7 at the light receiving portions and generates output signals SAu, SAd, SBu, SBd, and SC to SF.

Figure 10:
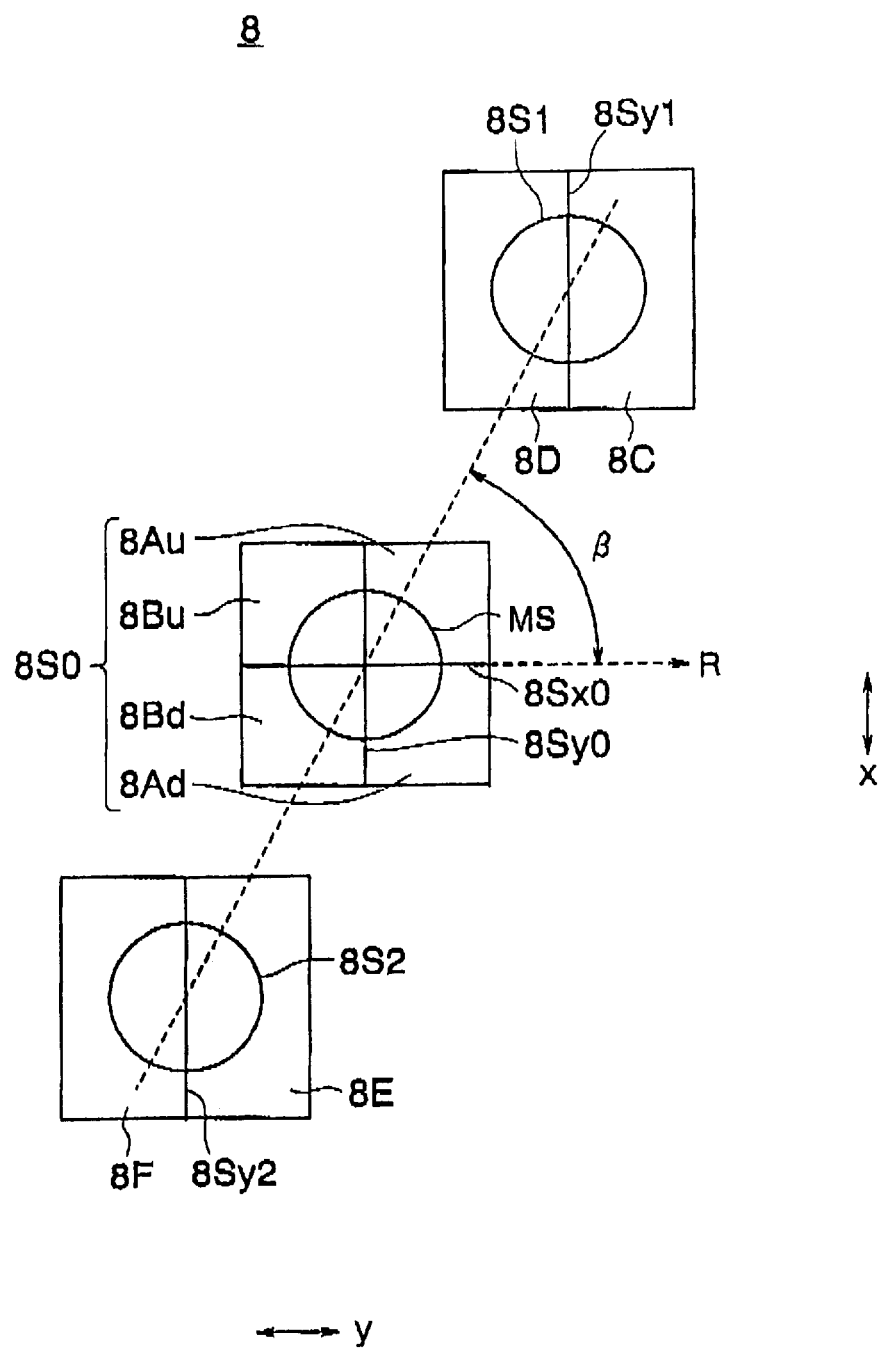
FIG. 10 is a schematic view of the configuration of the light receiving portions of a photo detector in FIG. 9.

FIG. 10 is a schematic view of the configuration of the light receiving portions of the photo detector 8 in FIG. 9.

The photo detector 8 has a main light receiving portion 8S0 for receiving a main light reflected from the optical disc and passed through the cylindrical lens n and first and second sub light receiving portions 8S1 and 8S2 for receiving first and second sub lights reflected from the optical disc.

The first and second sub light receiving portions 8S1 and 8S2 are positioned at the angle symmetrical positions in the x-direction and y-direction with respect to the main light receiving portion 8S0. The dotted line passes through centers of the light receiving portions 8S0, 8S1 and 8S2, and is inclined an angle β to the center line 8Sx0.

Each of the light receiving portions 8S0 to 8S2 of the photo detector 8 is divided in a direction corresponding to the track direction of the optical disc 80 in the positional relationships of the beams and is divided so that push-pull signals in the disc radial direction or the signals corresponding to the related push-pull signals can be detected.

The main light receiving portion 8S0 is equally divided into four or substantially equally divided into four by two orthogonal division lines 8Sx0 and 8Sy0 and have four divided regions 8Au, 8Ad, 8Bu, and BBd. In the main light receiving portion 8S0 of FIG. 10, the main optical spot MS is formed by (the reflected beam of) the main laser beam from the cylindrical lens 7. The divided region 8Au generates an output signal SAu in accordance with the amount of light (amount of reflected light) of the main laser beam irradiated to the related region 8Au. The divided region 8Ad generates an output signal SAd in accordance with the amount of light of the main laser beam irradiated to the related region BAd. The divided region 8Bu generates an output signal SBu in accordance with the amount of light of the main laser beam irradiated to the related region SBu. The divided region 8Bd generates an output signal SBd in accordance with the amount of light of the main laser beam irradiated to the related region 8Bd.

The direction of the main (enter) line of the cylindrical lens 7 exhibits an angle of about 45 degrees or about 135 degrees with respect to the direction of the division line 8Sx0 or the division line 8Sy0 of the main light receiving portion 8S0. The division line 8Sy0 (or division line 8Sx0)

of the main light receiving portion 8S0 with the main laser beam reflected at the optical disc 80 supplied thereto corresponds to the track direction of the optical disc 80 and has become parallel or substantially parallel to the related track direction.

An intersecting point of the division lines 8Sx0 and 8Sy0 is positioned at the center or schematic center of the main laser beam passing through the cylindrical lens 7.

The shape of the main optical spot MS formed in the main light receiving portion 8S0 varies in a diagonal direction in accordance with the distance between the optical disc 80 and the object lens 2, and therefore a focus deviation at the optical disc 80 can be detected by an astigmatism method based on the output signals SAu, SAd, SBu, and SBd generated by the divided regions 8Au, 8Ad, 8Bu, and 8Bd. Note that the angle exhibited by the direction with the light receiving portions 8S0 to 8S2 arranged therein and the division line 8Sy0 (or division line 8Sx0) coincides or substantially coincides with the orientation β.

The first sub light receiving portion 8S1 is equally divided into two or substantially equally divided into two by the division line 8Sy1 and has two divided regions 8C and 8D. In the first sub light receiving portion 8S1 of FIG. 10, a sub optical spot SS1 is formed by (the reflected beam of) the first sub laser beam from the cylindrical lens 7. The divided region 8C generates an output signal SC in accordance with the amount of light (amount of reflected light) of the sub laser beam irradiated to the related region 8C. The divided region 8D generates an output signal SD in accordance with the amount of light of the laser beam irradiated to the related region 8D. The center of the first sub light receiving portion 8S1 is positioned at the center or substantial center of the first sub laser beam passing through the cylindrical lens 7.

The second sub light receiving portion 8S2 is equally divided into two or substantially equally divided into two by the division line 8Sy2 and has two divided regions 8E and 8F. In the second sub light receiving portion 8S2 of FIG. 10, a sub optical spot SS2 is formed by (the reflected beam of) the second sub laser beam from the cylindrical lens 7. The divided region 8E generates an output signal SE in accordance with the amount of light (amount of reflected light) of the sub laser beam irradiated to the related region 8E. The divided region 8F generates an output signal SF in accordance with the amount of light of the laser beam irradiated to the related region 8F. The center of the second sub light receiving portion 8S2 is positioned at the center or substantial center of the second sub laser beam passing through the cylindrical lens 7. The division lines 8Sy0 to 8Sy2 have become parallel or substantially parallel to each other.

Figure 11:
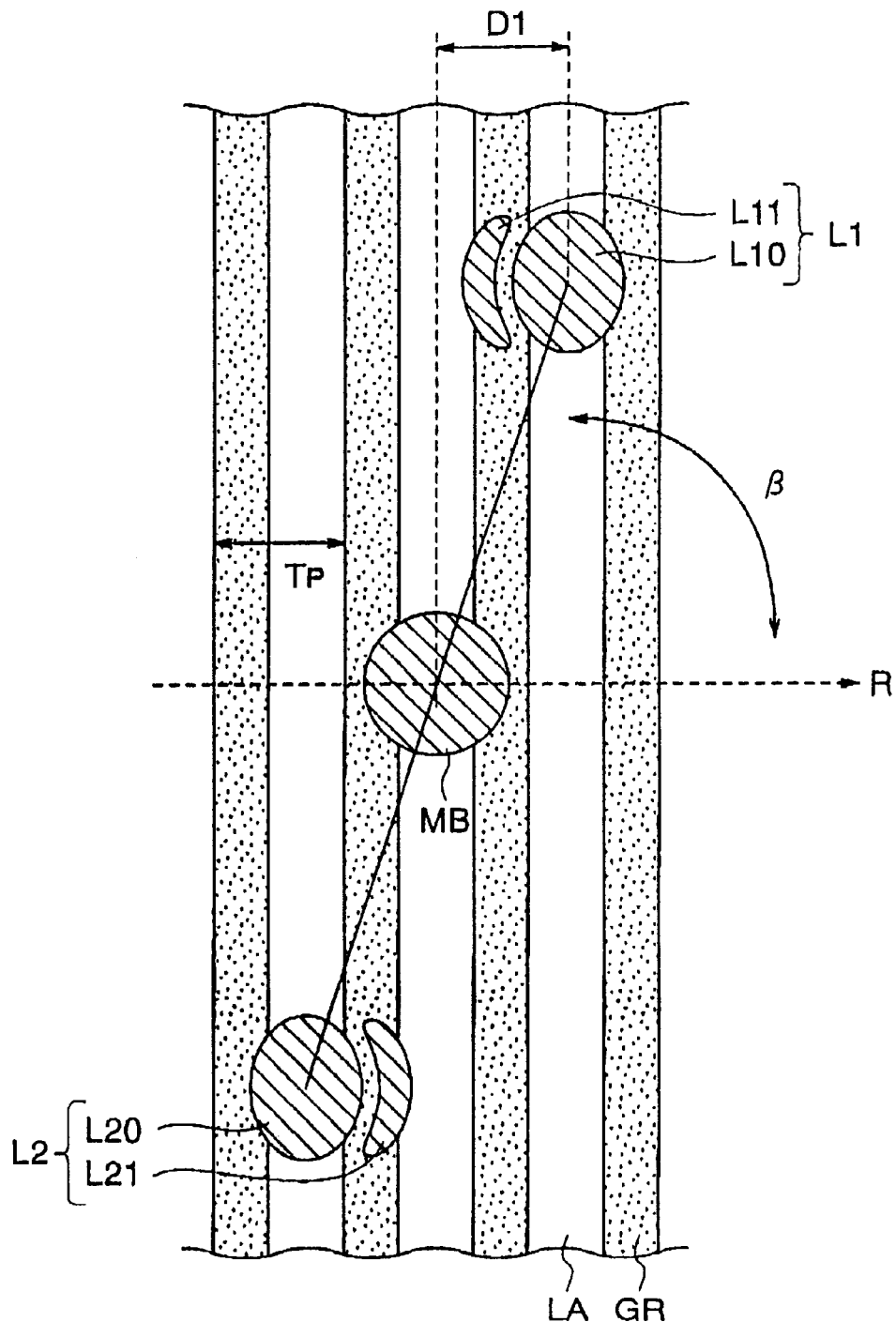
FIG. 11 is a view illustrating an arrangement of optical spots on the recording surface of an optical disc and a view of a case when an orientation β is less than 90 degrees.

FIG. 11 is a view of the arrangement of the optical spots on the recording surface of the optical disc.

The recording surface of the optical disc 80 is formed with lands LA and grooves GR. The groove GR comprises the track guide groove. The pitch of the lands LA and the pitch of the grooves GR are equal to the track pitch Tp.

The recording surface of the optical disc 80 is formed with the main optical spot MS by the main laser beam having a large amount of light and first and second sub optical spots L1 and L2 by the first and second sub laser beams having a small amount of light.

The first sub optical spot L1 has a spot L10 corresponding to a main lobe, and a spot L11 corresponding to the side lobe.

The second sub optical spot L2 has a spot L20 corresponding to the main lobe and a spot L21 corresponding to the side lobe.

The main laser beam is reflected at the main optical spot MB and supplied to the light receiving portion 8S0 of the photo detector 8.

The first sub laser beam is reflected at the first optical spot L1 and supplied to the first sub light receiving portion 8S1 of the photo detector 8. The center of the sub laser beam reflected at the spot L1 is positioned at the center or substantial center of the first sub light receiving portion 8S1.

The second sub laser beam is reflected at the second optical spot L2 and supplied to the second sub light receiving portion 8S2 of the photo detector 8. The center of the sub laser beam reflected at the spot L2 is positioned at the center or substantial center of the second sub light receiving portion 8S2.

Note that, the light receiving portions 8S0 to 8S2 of the photo detector 8 of FIG. 10 are configured so that the push-pull signal in the disc radial direction can be detected by the division lines 8Sy0 to 8Sy2. Also, when the optical spots MB, L1, and L2 on the recording surface move in the disc radial direction R, the optical spots MS, SS1, and SS2 of the light receiving portions 8S0 to 8S2 move in the direction R corresponding to the disc radial direction R.

In FIG. 11, the distances from the main optical spot MB of the optical disc 80 to the two sub optical spots L1 and L2 are equal and determined by the angle α.

Also, when there are two sub optical spots L1 and L2 at the intended locations, the orientation β is set so that a phase distribution equivalent or substantially equivalent to the phase distribution created by the tilt of the disc substrate in the disc radial direction is given with respect to the two sub optical spots L1 and L2.

In the diffraction grating 9 in the optical pick-up 50, the orientations of the sub optical spots with respect to the disc radial direction R are determined so that two sub optical spots are positioned on a track aimed at in advance. The positions of the two sub optical spots are adjusted by rotating the diffraction grating 9 to achieve a predetermined angle of rotation and arrange the spots on the intended track.

Namely, a distance D1 in the disc radial direction from the center of the main optical spot MB to the centers of two sub optical spots L1 and L2 is expressed by the following equation (5) by using the pitch of the groove GR (or the track pitch) Tp and 0 or more integer n.

$$D1 = n \times Tp \tag{5}$$

In the explanatory view of FIG. 11, the center of the main optical spot MB is positioned at the center of a land LA, and the centers of the sub optical spots L1 and L2 are positioned in adjacent lands LA.

Figure 12:
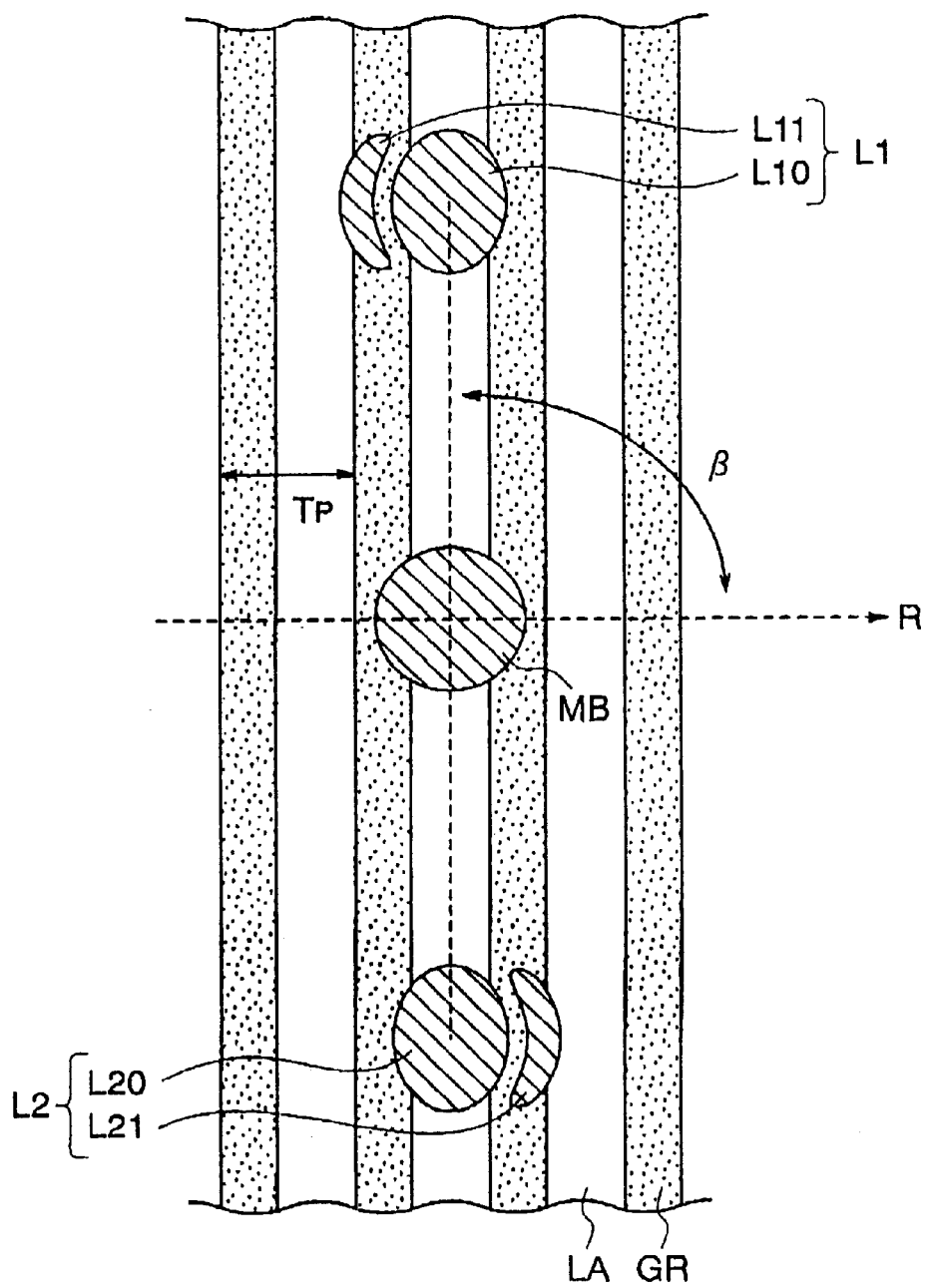
FIG. 12 is a view illustrating an arrangement of optical spots on the recording surface of an optical disc and a view of a case when an orientation β is 90 degrees.

FIG. 12 is a view of the arrangement of the optical spots on the recording surface of the optical disc. In the view of FIG. 12, the center of the main optical spot MB and the centers of the sub optical spots L1 and L2 are positioned at the center of the same land LA.

By arranging two sub optical spots on the track the same as that for the main optical spot by making the orientation β 90 degrees or substantially 90 degrees, the influence of variation of signals among tracks can be suppressed for various signals generated based on the main optical spot MB and the sub optical spots L1 and L2.

Next, an explanation will be made of the method of generation of the tracking error signal TE and the cross track signal CT.

By the output signals of the light receiving portions 8S0 to 8S2 of the photo detector 8 of FIG. 10, the push-pull signal corresponding to the main optical spot MS (main push-pull signal) PP0, the push-pull signal corresponding to the sub optical spot SS1 (sub push-pull signal) PP1, and the push-pull signal corresponding to the sub optical spot SS2 (sub push-pull signal) PP2 can be obtained. The push-pull signals PP0 to PP2 are expressed as in the following equations 6A to 6C.

$$PP0 = SAu + SAd - SBu - SBd \tag{6A}$$

$$PP1 = SC - SD \tag{6B}$$

$$PP2 = SE - SF \tag{6C}$$

Figure 13:
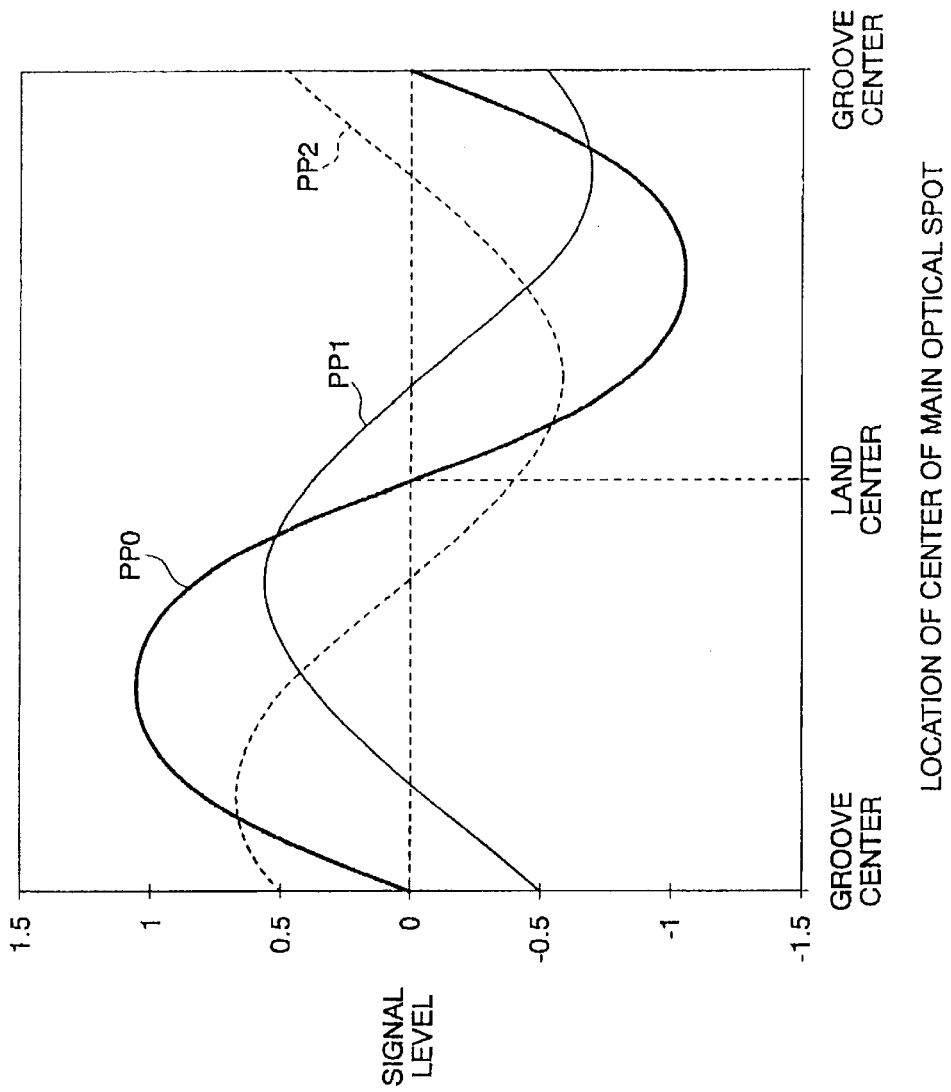
FIG. 13 is a schematic waveform diagram illustrating push-pull signals obtained from output signals of the photo detector of FIG. 10.

FIG. 13 is a schematic waveform diagram illustrating the push-pull signals PP0 to PP2.

In FIG. 13, the case when θ=0.7 degree, NA=0.6, λ=400 nm, t=0.6 mm, Tp=0.78 μm, and a ratio of widths of the lands and grooves is 1:1 is exemplified.

The tracking error signal TE can be obtained by the following equation 7A. Note that, as the value of the coefficient k, various values can be set. By setting this as in the following equation 7E, the tracking error signal TE can be stabilized when there is an eccentricity in the optical disc 80.

$$TE = PP0 - k(PP1 + PP2) \tag{7A}$$

$$k = (SAu + SAd - SBu - SBd)/(SC + SD + SE + SF) \tag{7B}$$

The main optical spot MB and the sub optical spots L1 and L2 are arranged on the lands LA. Therefore, when the conventional diffraction grating with linear grooves formed therein is used, PP0, PP1, and PP2 become the same phase. Therefore, if subtraction is carried out so as to cancel the influence due to the movement of the object lens, the tracking error signal TE becomes 0, so the tracking error cannot be detected.

In the present embodiment, however, by comprising the diffraction grating based on the above equations (1) to (4), it is possible to freely set the phase relationships between PP0 and PP1 and PP2, and the signal PP0 and the sum signal (PP1+PP2) are given different phases.

Note that an absolute value of the phase difference between the signal PP0 and the sum signal (PP1+PP2) can be set at several tens of degrees to about 180 degrees, but is desirably set at 180 degrees or substantially 180 degrees. Also, in FIG. 13, it is also possible to comprise the diffraction grating so that the phases of the signals PP1 and PP2 become inverse phases or substantially inverse phases.

The cross track signal CT can be obtained by the following equation (8).

$$CT = PP1 - PP2 \tag{8}$$

PP1−PP2 is the differential signal between the push-pull signal PP1 corresponding to one of the ±1st order diffraction lights and the push-pull signal PP2 corresponding to the other of the ±1st order diffraction lights. This differential signal has a phase different from the push-pull signal PP0 by the 0-th order diffraction light by 90 degrees. For this reason, this differential signal (PP1−PP2) takes the maximum value or the minimum value when the tracking error signal TE is 0.

Namely, the cross track signal CT becomes the maximum value or the minimum value when the location of the center of the main optical spot MB exists at the center of a land LA or the center of a groove GR, so a stable signal can be obtained.

Figure 14:
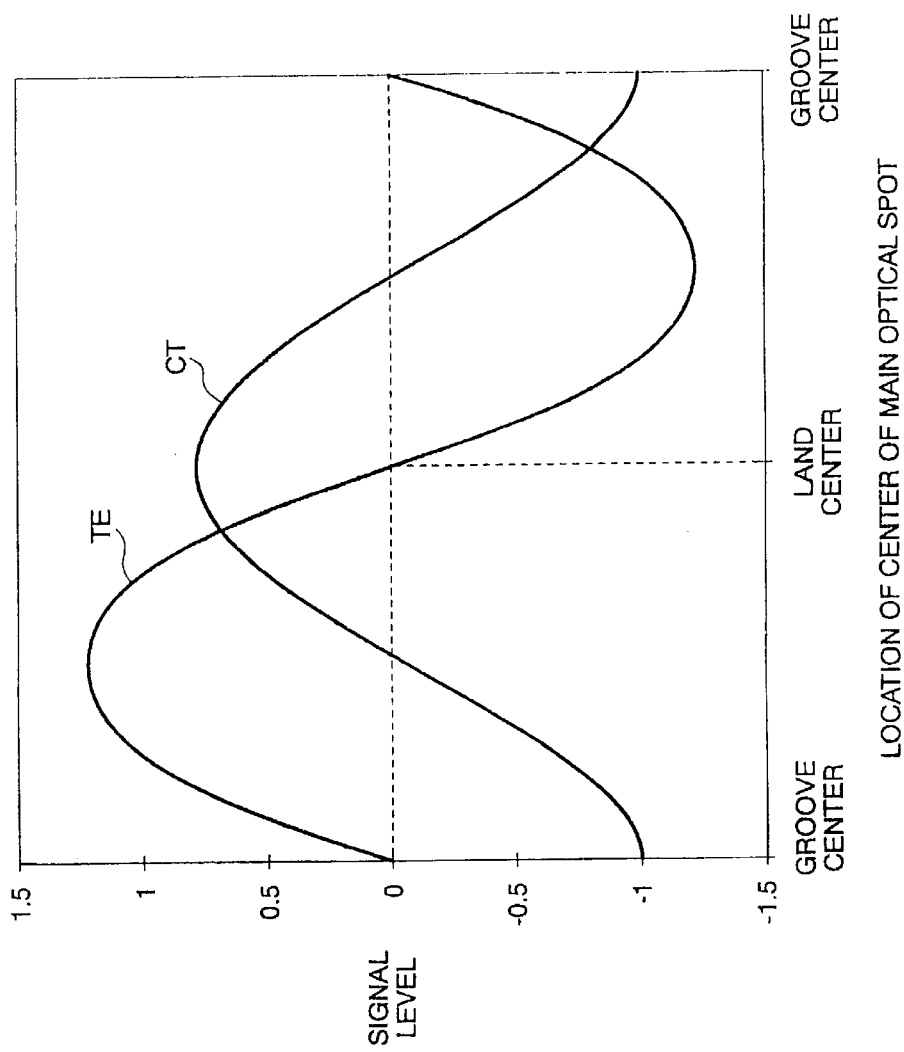
FIG. 14 is a schematic waveform diagram illustrating a tracking error signal and a cross track signal.

FIG. 14 is a schematic waveform diagram illustrating the tracking error signal TE and the cross track signal CT. This waveform diagram illustrates the case where the ratio of widths of the lands and the grooves is 1:1.

As shown in FIG. 14, there is a phase difference of 90 degrees between the tracking error signal TE and the cross track signal CT, so a cross track signal CT having a preferred characteristic is obtained.

In the optical disc, one track is divided into several or several tens of sectors. Data is managed by utilizing the sectors.

In each sector, a sector address is recorded in advance according to the difference of pits (or emboss pits) or reflection rates.

Therefore, when the optical spots MB, L1, and L2 are positioned in data region with the lands LA and the grooves GR formed therein, the tracking error signal TE and the cross track signal CT can be detected, while the optical spots MB, L1, and L2 are positioned in the address region with the pits indicating the sector address formed therein, the tilt error signal TS can be detected.

Figure 15:
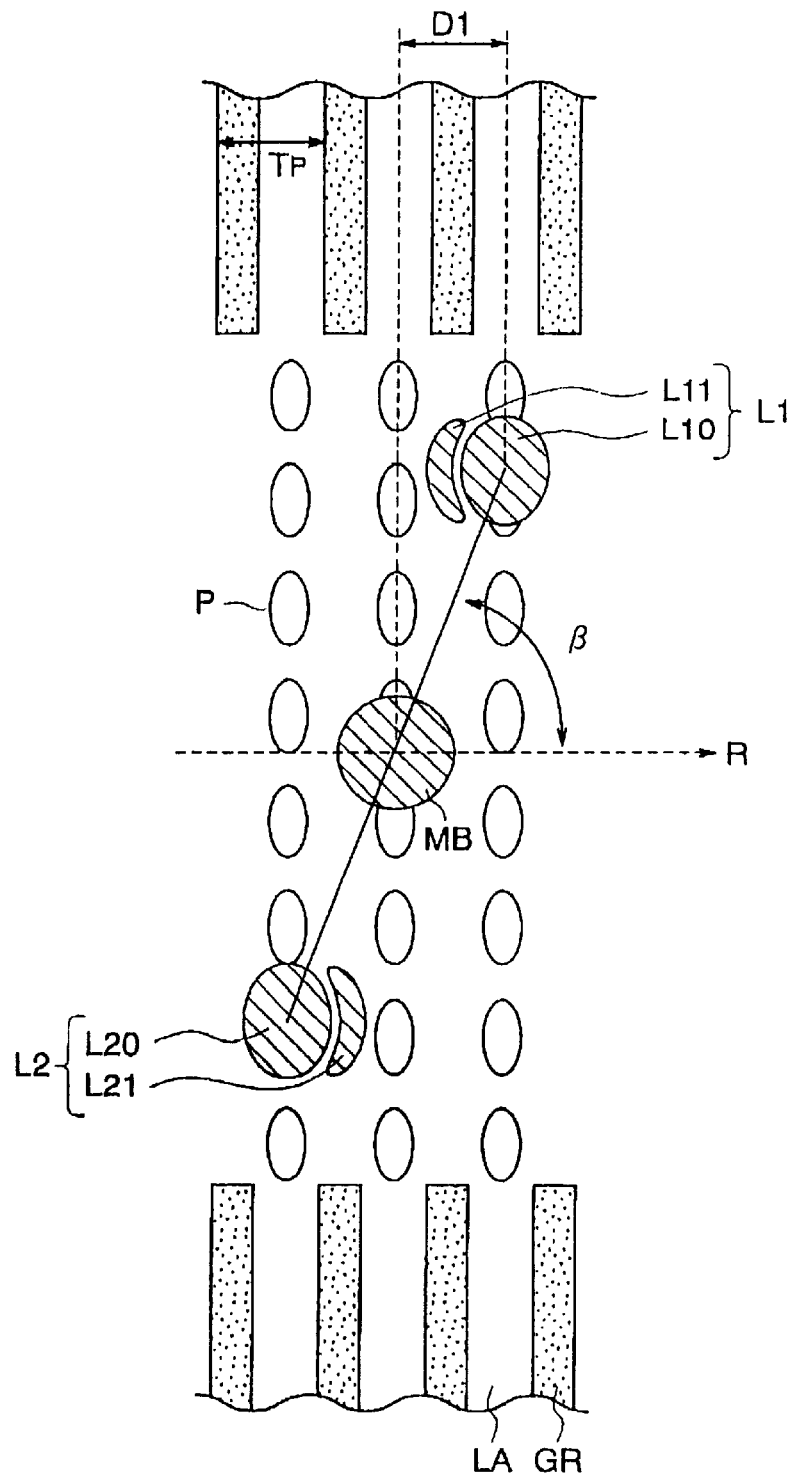
FIG. 15 is a view illustrating the arrangement of optical spots on the recording surface of the optical disc and a view of a case when the orientation β is less than 90 degrees.

FIG. 15 is a view of the arrangement of the optical spots on the recording surface of the optical disc.

In FIG. 15, vertically long pits P are arranged in the vertical direction in the track direction vertical to the disc radial direction (radial direction) R, and the sector address is recorded by the pits P. Note that, the pits P can be emboss pits in a CD or other optical disc or can be pits corresponding to the variation of the reflection rate in a phase variation type optical disc.

The pits P are formed on an extension of the recording track. By the revolution of the optical disc 80, the optical spots MB, L1, and L2 move to the region of the recording surface shown in FIG. 15 from the region of the recording surface shown in FIG. 11 and scan the pits P.

In FIG. 15, an address recorded according to the variation of the locations of the pits can be reproduced by the main optical spot MB. The sub optical spots L1 and L2 pass over the pits of the same track or different tracks, so the tilt can be detected with a high precision.

Note that, the two sub optical spots can be adjusted in position adjustment to be arranged on the intended tracks oby rotating the diffraction grating 9 and giving a predetermined angle of rotation. At this time, desirably the angle of rotation is finely adjusted so that the amplitudes of the alternating current components of the reproduced signals (sum signal) corresponding to two sub optical spots become the maximum or substantially maximum.

Particularly, by arranging two sub optical spots L1 and L2 on the track the same as that for the main optical spot MB by setting the orientation β at 90 degrees or substantially 90 degrees, the influence of the variation of the signals among the tracks can be suppressed. Even when the tracks meander, it is possible to stably detect the amplitudes of the alternating current components of the reproduced signals.

Figure 16:
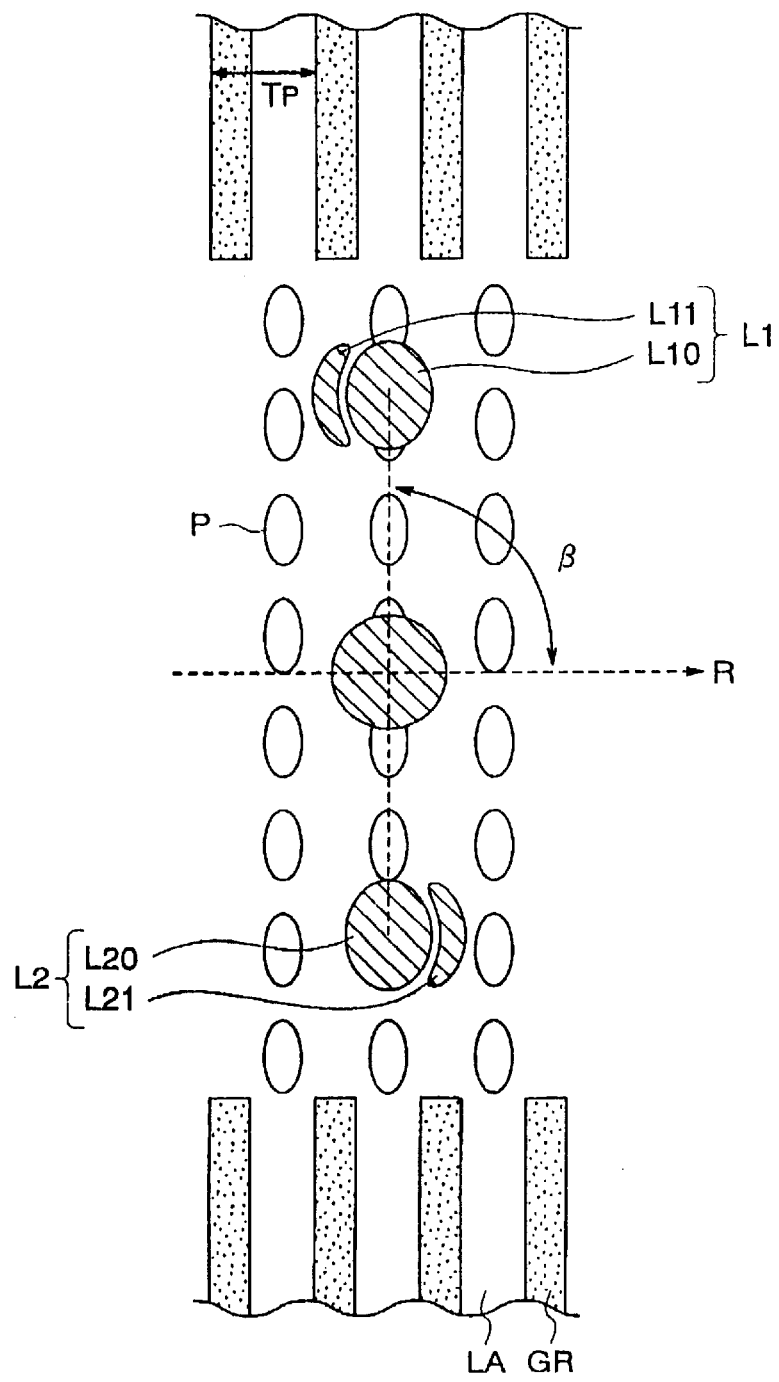
FIG. 16 is a view illustrating the arrangement of optical spots on the recording surface of the optical disc and a view of a case when the orientation β is 90 degrees.

A view of the arrangement of the optical spots on the recording surface of the optical disc in the case where the orientation β=90 degrees is given in FIG. 16.

Figure 17:
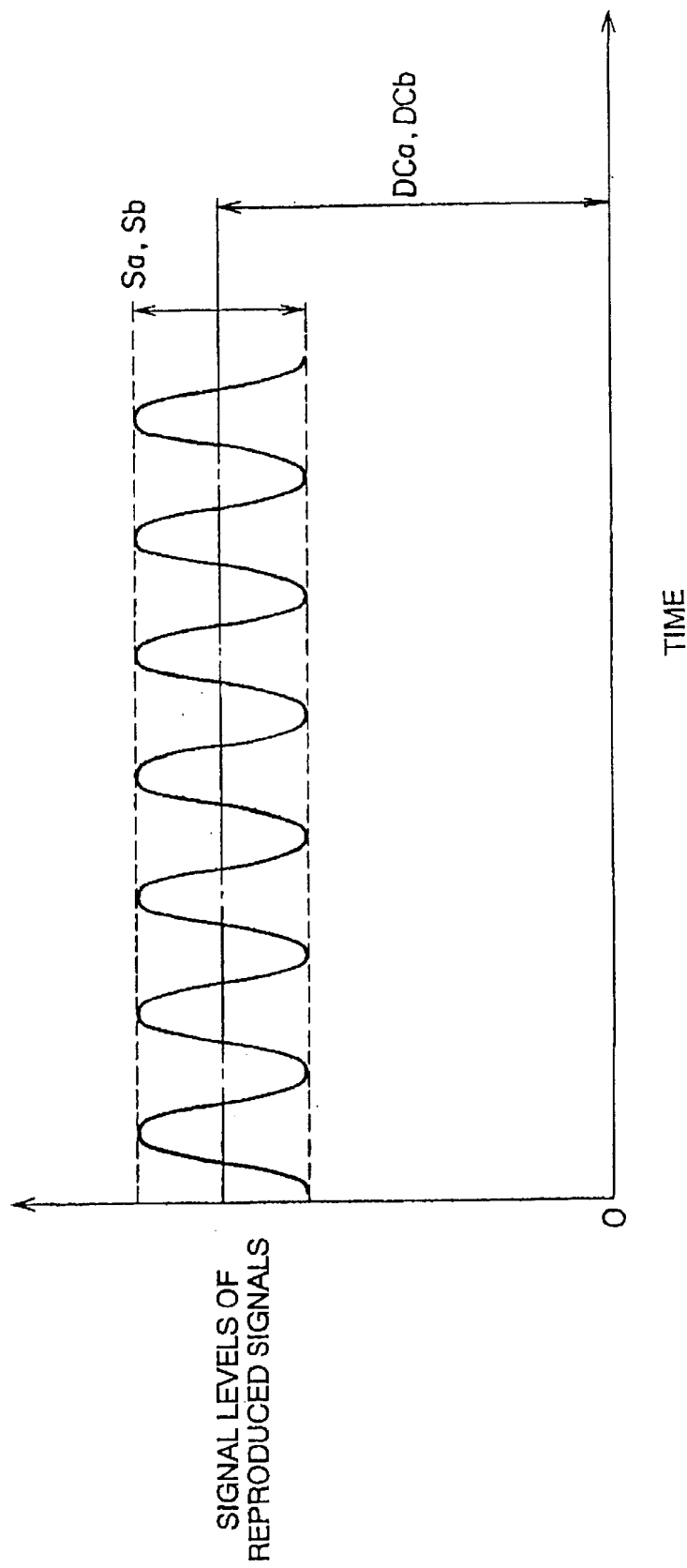
FIG. 17 is a waveform diagram of waveforms of reproduced signals corresponding to two sub laser beams.

FIG. 17 is a waveform diagram showing the waveforms of the reproduced signal (sub reproduced signals) corresponding to two sub laser beams, and an explanatory view of the method of generation of the tilt error signal TS.

A tilt error signal TS(1) is given by the following equation (9) by using the signal Sa indicating the magnitude of the amplitude of the alternating current component of the reproduced signal obtained from the first sub laser beam and the signal Sb indicating the magnitude of the amplitude of the alternating current component of the reproduced signal obtained from the second sub laser beam (or the signals Sa and Sb obtained by subtracting the direct current components of the related reproduced signals from the reproduced signals).

$$TS(1) = Sa - Sb \tag{9}$$

Here, an envelope line detection of the reproduced signal (pit signal) is carried out because the direct current component (DC component) of the optical spatial frequency has a low sensitivity with respect to the tilt (skew). Therefore, by using the high frequency component of the reproduced signal, high precision detection of the tilt error signal is enabled.

When considering the variation of sensitivity of the light receiving portions, desirably the alternating current component (envelope line detection signal) is standardized by the direct current component. When the direct current component of the reproduced signal obtained from the first sub laser beam is DCa, and the direct current component of the reproduced signal obtained from the second sub laser beam is DCb, the standardized tilt error signal TS(2) is expressed by the following equation (10). Also, by using this tilt error signal TS(2), the difference of light intensity between two sub laser beams can be amended or corrected, so it is possible to improve the reliability of the tilt detection.

$$TS(2)=Sa/DCa-Sb/DCb \qquad (10)$$

Figure 18:
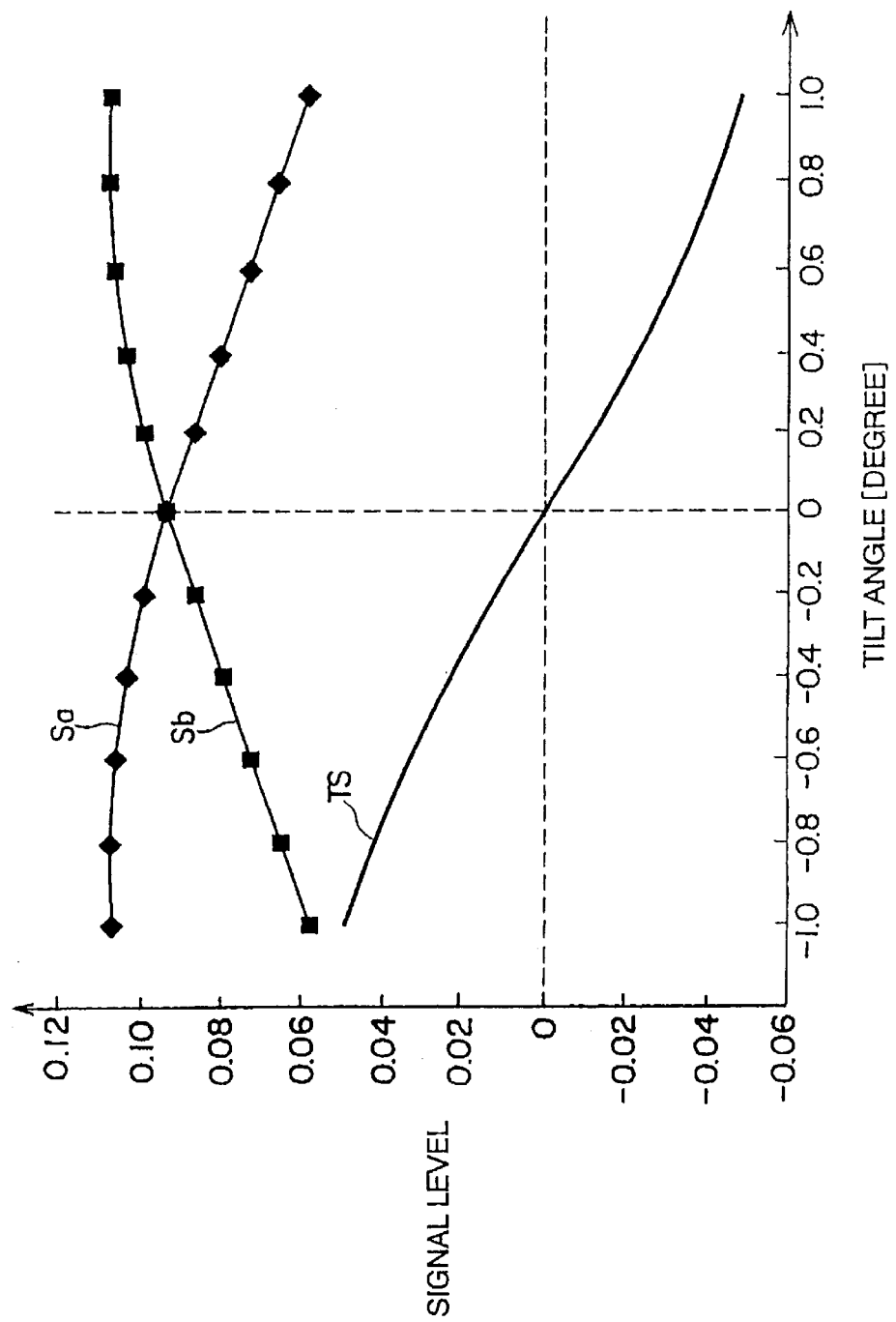
FIG. 18 is a view illustrating relationships between signals Sa and Sb indicating magnitudes of amplitudes of alternating current components of reproduced signals obtained from first and second sub laser beams and a tilt error signal.

FIG. 18 is a graph, illustrating the relationships between the signals Sa and Sb indicating the magnitudes of the amplitudes of the alternating current components of the reproduced signals (sub reproduced signals) obtained from the first and second sub laser beams and the tilt error signal TS.

In FIG. 18, the values of the parameters are set as follows: $\theta=0.7$ degree, $\alpha=0.2$ degree, $\beta=90$ degrees, NA=0.6, $\lambda=650$ nm, t=0.6 mm, n=1.5, r=2 mm, $W_{11}=-2W_{31}/3-W_{51}/2$.

The signal Sa becomes the maximum value when the tilt angle in the disc radial direction is about −0.7 degree and becomes monotonously smaller as the tilt angle becomes larger. The signal Sb becomes the maximum value when the tilt angle in the disc radial direction is about +0.7 degree and becomes monotonously smaller as the tilt angle becomes smaller.

In FIG. 18, the tilt error signal TS=Sa−Sb is set, the signal level becomes 0 when the tilt angle is 0 degree, and it has a good linearity. Also, the sign is inverted in accordance with the positive or negative state of the tilt angle, and preferred characteristics are obtained.

Figure 19:
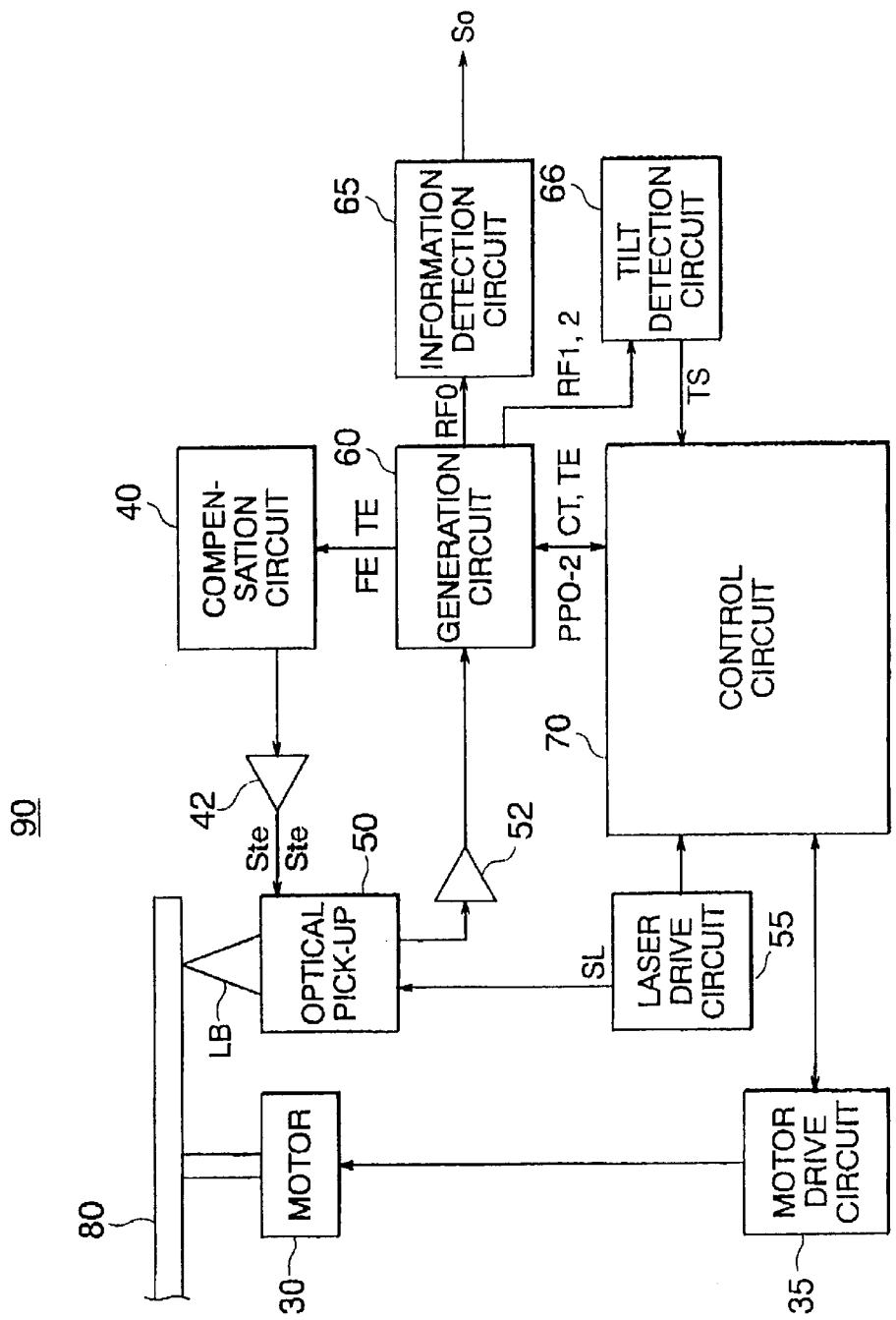
FIG. 19 is a schematic block diagram of the configuration of an embodiment of an optical disc drive having an optical pick-up shown in FIG. 9, and a schematic block diagram of the configuration of an embodiment of an error signal detection device.

FIG. 19 is a schematic block diagram of the configuration of an embodiment of the optical disc drive having the optical pick-up 50 shown in FIG. 9. This optical disc drive 90 comprises the error signal detection device.

The optical disc drive 90 has a motor 30, motor drive circuit 35, compensation circuit 40, amplifier circuit 42, optical pick-up 50, amplifier circuit (head amplifier) 52, laser drive circuit 55, generation circuit 60, information detection circuit 65, tilt detection circuit 66, and control circuit 70. This optical disc drive 90 reproduces the recording information recorded on the optical disc 80.

The control circuit 70 is a controller controlling the entire optical disc drive 90 and is comprised by for example a microcomputer.

This control circuit 70 controls the motor 30, motor drive circuit 35, laser drive circuit 55, optical pick-up 50, compensation circuit 40, generation circuit 60, information detection circuit 65, tilt detection circuit 66, etc.

The optical pick-up 50 irradiates a laser beam LB to the reproduction position of the optical disc 80 at the time of reproduction. The laser beam LB has the 0-th order diffraction light and the ±1st order diffraction lights.

The laser drive circuit 55 generates a drive signal SL under the control of the control circuit 70, drives the semiconductor laser 4 in the optical pick-up 50 by this drive signal SL, and makes the semiconductor laser 4 output the laser beam LB therefrom.

The motor 30 is comprised by for example a spindle motor and rotates the optical disc 80 by the predetermined speed. This motor 30 rotates the optical disc 80 so that the linear velocity becomes constant as an example.

The motor drive circuit 35 supplies a drive power to the motor 30 and drives the motor 30. This motor drive circuit 35 can control the speed of the motor 30 by pulse width modulation (PWM) or can control the speed by a phase locked loop (PLL).

The amplifier circuit 52 amplifies the output signals SAu, SAd, SBu, SBd, and SC to SF of the light receiving portions of the photo detector 8 provided in the optical pick-up 50 and supplies the same to the generation circuit 60.

The generation circuit 60 generates a reproduced signal (main reproduced signal) RF0 corresponding to the amount of light of the main laser beam, a reproduced signal (sub reproduced signal) RF1 corresponding to the amount of light of the first sub laser beam, a reproduced signal (sub reproduced signal) RF2 corresponding to the amount of light of the second sub laser beam, a focus error signal FE, tracking error signal TE, push-pull signals PP0 to PP2, and the cross track signal CT based on the amplified output signals SAu, SAd, SBu, SBd, and SC to SF from the amplifier circuit 52.

This generation circuit 60 generates for example the reproduced signal (sum signal) RF0 based on the sum of the output signals SAu, SAd, SBu, and SBd (SAu+SAd+SBu+SBd) from the amplifier circuit 52.

Also, it generates a reproduced signal RF1 based on the sum (SC+SD) of the output signals SC and SD from the amplifier circuit 52. Also, it generates a reproduced signal RF2 based on the sum (SE+SF) of the output signals SE and SF from the amplifier circuit 52. Also, the generation circuit 60 generates for example a focus error signal FE by the astigmatism method based on the diagonal difference (SAu+SBd−SAd−SBu) of the output signals SAu, SAd, SBu, and SBd from the amplifier circuit 52. Also, the generation circuit 60 generates for example a push-pull signal PP0 (=SAu+SAd−SBu−SBd) and generates a tracking error signal TE as a differential push-pull signal by the DPP method based on the push-pull signals PP0 to PP2. Also, the generation circuit 60 generates for example the cross track signal CT (=PP1−PP2) from the push-pull signals PP1 and PP2 and supplies the same to the control circuit 70. Further, the generation circuit 60 supplies the push-pull signals PP0 to PP2 to the control circuit 70.

The compensation circuit 40 generates compensated signals obtained by compensating (phase compensating and/or frequency compensating) the focus error signal FE and the tracking error signal TE and supplies these compensated signals to the amplifier circuit 42.

The amplifier circuit 42 supplies the drive signal Sfe obtained by amplifying the compensated signal of the focus error signal FE to the tracking actuator 2F in the optical pick-up 50. Also, the amplifier circuit 42 supplies the drive signal Ste obtained by amplifying the compensated signal of the tracking error signal TE to the tracking actuator 2T in the optical pick-up 50.

The tilt detection circuit 66 detects the magnitudes Sa and Sb of the amplitudes of the alternating current components of the reproduced signals RF1 and RF2 and detects the tilt or tilt angle based on the magnitudes Sa and Sb. Concretely, it generates a tilt error signal TS corresponding to the tilt angle based on the difference between the magnitudes Sa and Sb. This tilt error signal TS is more preferably a standardized signal TS(2) than a not standardized signal TS(1).

The tilt detection circuit 66 supplies the tilt error signal TS to the control circuit 70.

The information detection circuit 65 is supplied with the reproduced signal RF0 from the generation circuit 60, performs demodulation, etc. of the reproduced signal RF0 to reproduce the recording information of the optical disc 80, and outputs the reproduced recording information as an output signal So.

Also, the information detection circuit 65 detects the address of the optical disc 80 from the reproduced signal RF0 and reproduces the recording information based on the related address.

Note that, it is also possible to provide a tilt correction mechanism for correcting the tilt of the optical disc 80 in the optical disc drive 90 and control the tilt correction mechanism based on the tilt error signal TS from the control circuit 70.

For example, the control circuit 70 controls the tilt correction mechanism of the optical disc 80 by a closed loop based on the tilt error signal TS. Also, the tilt correction mechanism can be controlled by a closed loop so that the tilt error signal TS becomes 0.

Note that, it is not necessary to obtain the reproduced signals RF1 and RF2 from the entire region of the recording surface of the optical disc 80. It is also possible to detect the reproduced signals RF1 and RF2 from the pits of the address region of the optical disc 80 and detect the tilt error signal TS based on the related reproduced signals RF1 and RF2. It is also possible to control the tilt correction mechanism by the related tilt error signal TS.

Also, the control circuit 70 performs tracking servo control based on the cross track signal CT and the tracking error signal TE generated at the generation circuit 60 and, at the same time, performs various control by using the push-pull signals PP0 to PP2.

Figure 20:
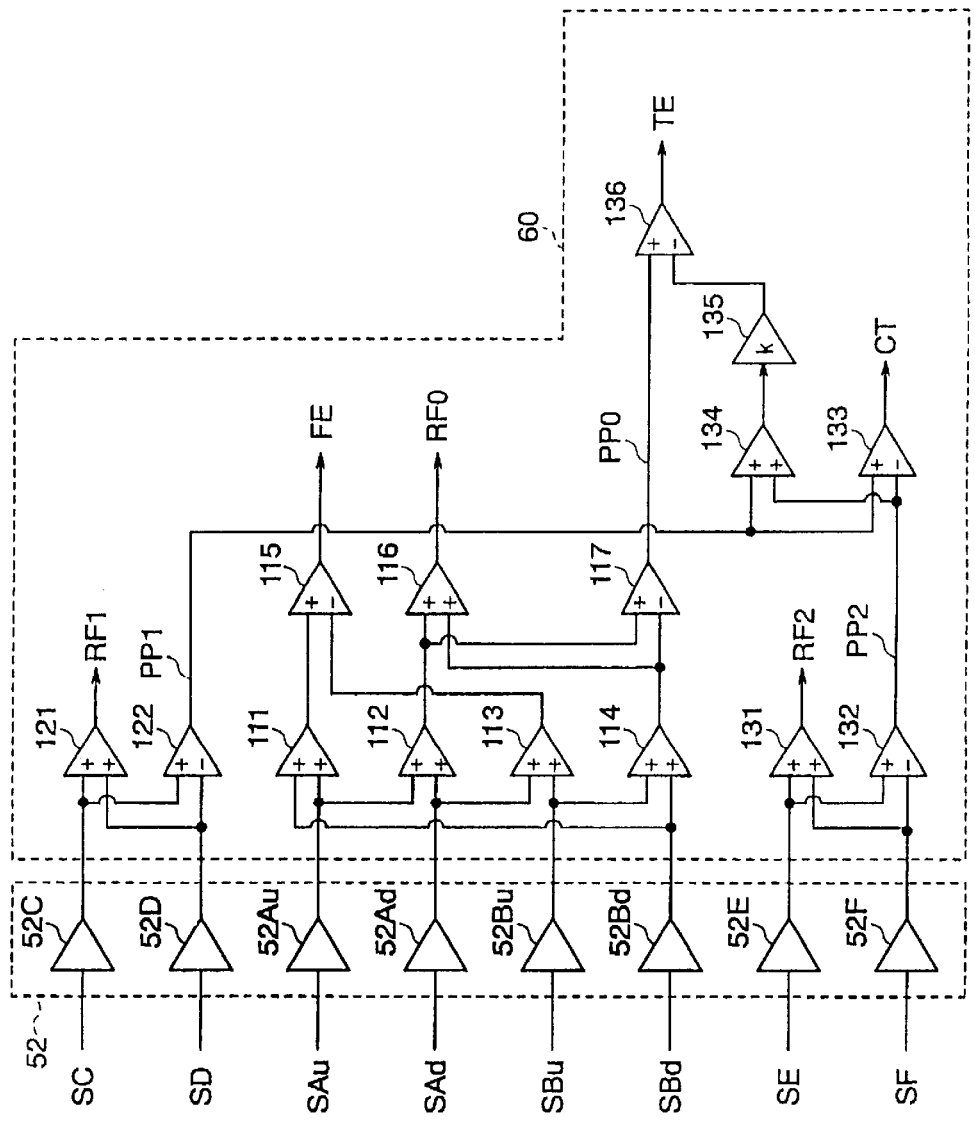
FIG. 20 is a circuit diagram illustrating an amplifier circuit and a generation circuit in an optical disc drive of FIG. 19.

FIG. 20 is a circuit diagram illustrating the amplifier circuit 52 and the generation circuit 60 in the optical disc drive 90 of FIG. 19.

The amplifier circuit 52 has amplifiers 52Au, 52Ad, 52Bu, 52Bd, and 52C to 52F.

The generation circuit 60 has adders 111 to 114, 116, 121, 131, and 134, subtractors 115, 117, 122, 132, 133, and 136, and a multiplier 135.

The signal SAu is amplified by the amplifier 52Au and supplied to the adders 111 and 112. The signal SAd is amplified by the amplifier 52Ad and supplied to the adders 112 and 113. The signal SBu is amplified by the amplifier 52Bu and supplied to the adders 113 and 114. The signal SBd is amplified by the amplifier 52Bd and supplied to the adders 111 and 114. The adder 111 adds the output signals of the amplifiers 52Au and 52Bd. The adder 112 adds the output signals of the amplifiers 52Au and 52Ad. The adder 113 adds the output signals of the amplifiers 52Ad and 52Bu. The adder 114 adds the output signals of the amplifiers 52Bu and 52Bd.

The subtractor 115 subtracts the output signal of the adder 113 from the output signal of the adder 111 and generates a focus error signal FE.

The adder 116 adds the output signals from the adders 112 and 114 and generates a reproduced signal RF0.

The subtractor 117 subtracts the output signal of the adder 114 from the output signal of the adder 112 and generates a push-pull signal PP0.

The adder 121 adds the output signals of the amplifiers 52C and 52D and generates a reproduced signal RF1.

The subtractor 122 subtracts the output signal of the amplifier 52D from the output signal of he amplifier 52C and generates a push-pull signal PP1.

The adder 131 adds the output signals of the amplifiers 52E and 52F and generates a reproduced signal RF2.

The subtractor 132 subtracts the output signal of the amplifier 52F from the output signal of the amplifier 52E and generates a push-pull signal PP2.

The subtractor 133 subtracts the push-pull signal PP2 from the push-pull signal PP1 and generates a cross track signal CT.

The adder 134 adds the push-pull signals PP1 and PP2.

The multiplier 135 multiplies the output signal of the adder 134 by k.

The subtractor 136 subtracts the output signal of the multiplier 135 from the push-pull signal PP0 and generates a tracking error signal TE.

Figure 21:
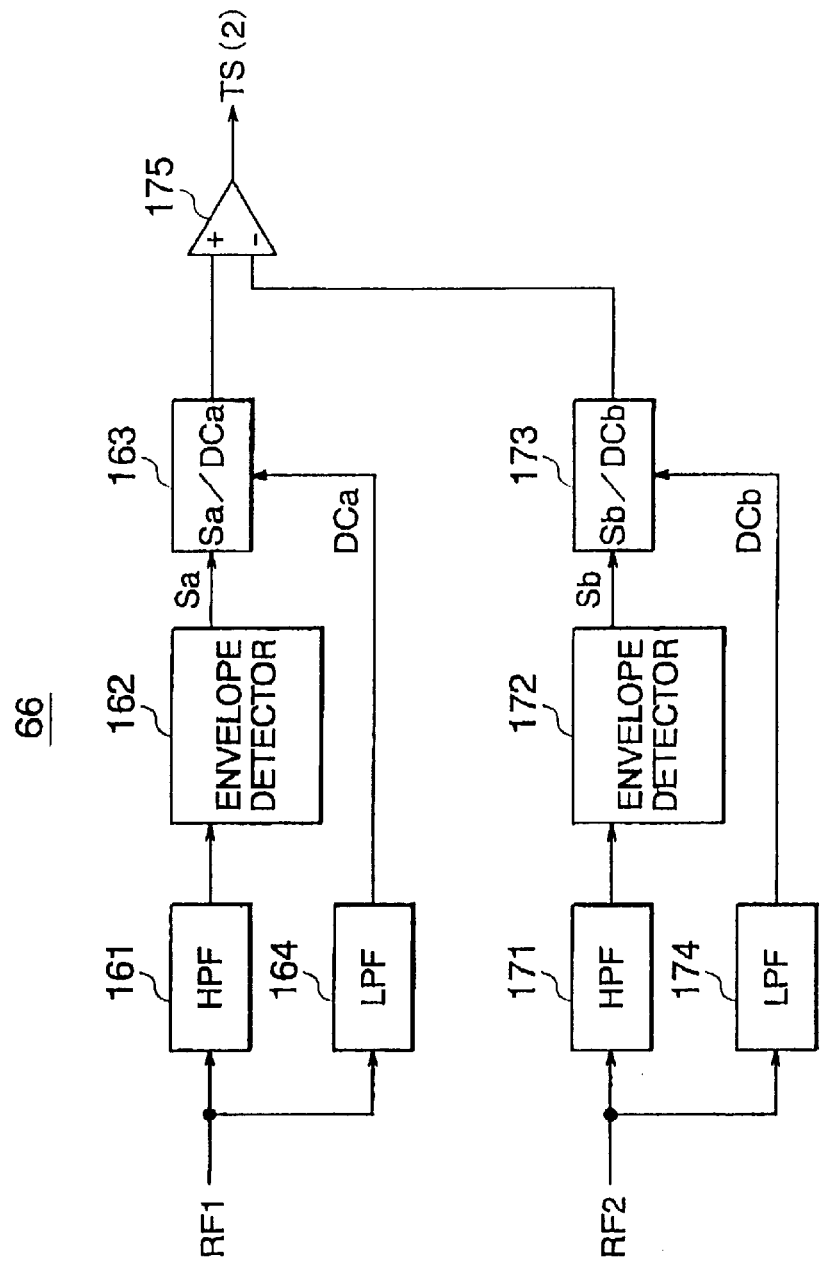
FIG. 21 is a circuit diagram illustrating a tilt detection circuit in the optical disc drive of FIG. 19.

FIG. 21 is a circuit diagram illustrating the tilt detection circuit 66 in the optical disc drive 90 of FIG. 19.

This tilt detection circuit 66 has high pass filters (HPF) 161 and 171, low pass filters 164 and 174, envelope detectors 162 and 172, dividers 163 and 173, and a subtractor 175.

The HPF 161 supplies the alternating current component (or high frequency component) of the reproduced signal RF1 to the envelope detector 162.

The envelope detector 162 detects the envelope of the signal from the HPF 161 and supplies the same to the divider 163.

The LPF 164 supplies the direct current component (or low frequency component) of the reproduced signal RF1 to the divider 163.

The divider 163 divides the (amplitude of) the output signal Sa of the envelope detector 162 by a signal DCa from the LPF164.

The HPF 171 supplies the alternating current component (or high frequency component) of the reproduced signal RF2 to the envelope detector 172.

The envelope detector 172 detects the envelope of the signal from the HPF 171 and supplies this to the divider 173.

The LPF 174 supplies the direct current component (or low frequency component) of the reproduced signal RF2 to the divider 173.

The divider 173 divides the (amplitude of) the output signal Sb of the envelope detector 172 by a signal DCb from the LPF 174.

The subtractor 175 subtracts the output signal of the divider 173 from the output signal of the divider 163 and generates a tilt error signal TS(2).

Figure 22:
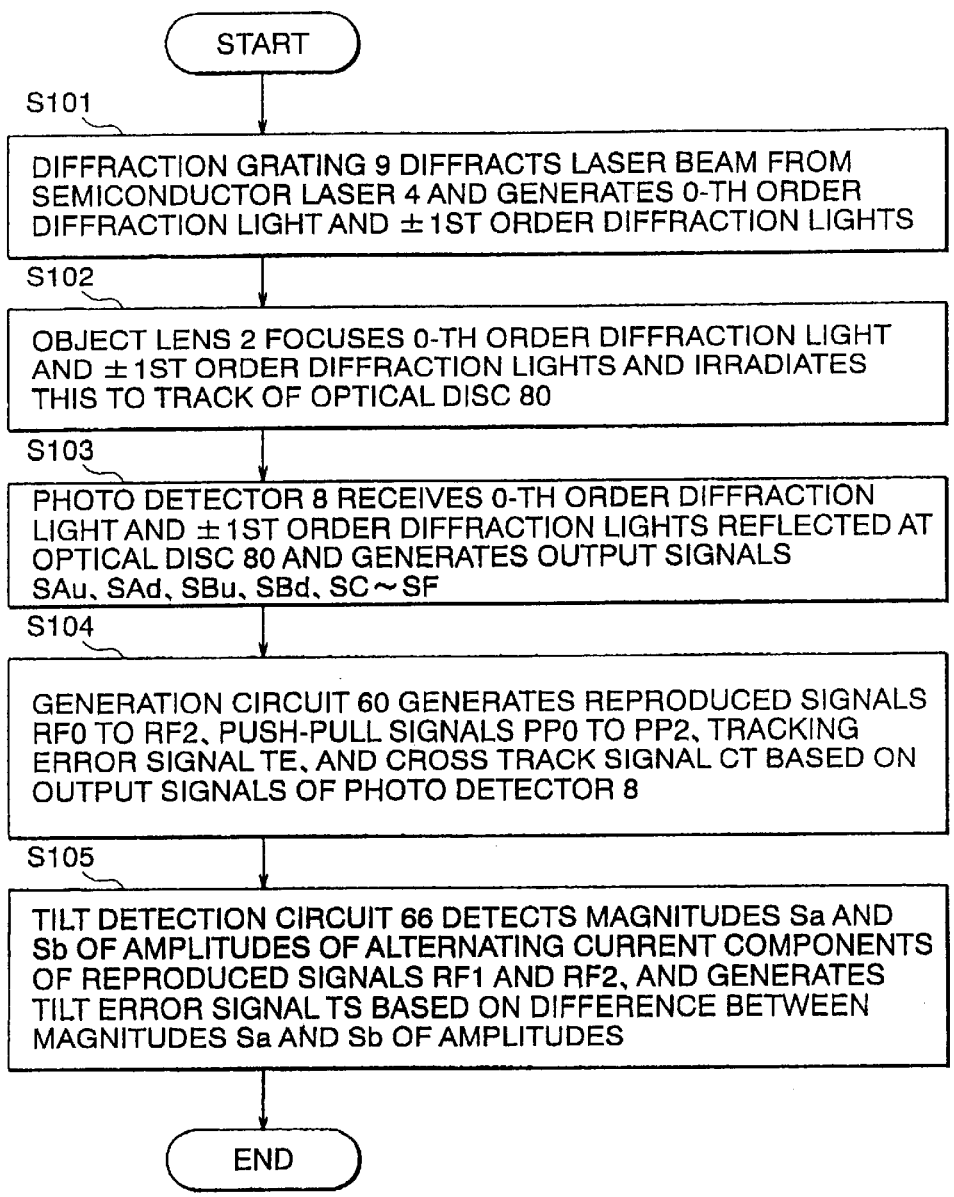
FIG. 22 is a schematic flowchart of a detection method of signals such as a tracking error signal TE in the optical disc drive (error signal detection device) of FIG. 19.

FIG. 22 is a schematic flowchart indicating the detection method of the tracking error signal TE or other signal in the optical disc drive (error signal detection device) 90.

First, at step S101, the diffraction grating 9 in the optical pick-up 50 diffracts the laser beam from the semiconductor laser 4 and generates a main laser beam comprised by the 0-th order diffraction light and the first and second sub laser beams comprised by the ±1st order diffraction lights.

The first and second sub laser beams have phase distributions equivalent or substantially equivalent to the wavefront aberration of the optical disc 80 when tilt occurs in the optical disc 80.

These laser beams (0-th order diffraction light and ±1st order diffraction lights) are supplied via the beam splitter 3 to the object lens 2.

At step S102, the object lens 2 focuses the laser beams (0-th order diffraction light and ±1st order diffraction lights) from the diffraction grating 9 and irradiates the same to the track of the optical disc 80. The laser beam focused by the object lens 2 is reflected at the optical disc 80 and passes through the object lens 2 again and supplied to the photo detector 8 through the beam splitter 3, focus lens 6, and the cylindrical lens 7.

At step S103, the photo detector 8 receives the laser beams (0-th order diffraction light and ±1st order diffraction lights) reflected at the optical disc 80 at the light receiving portions 8S0 to 8S2 and generates output signals SAu, SAd, SBU, SBd, and Sc to SF. These output signals SAu, SAd, SBu, SBd, and SC to SF are supplied via the amplifier circuit (head amplifier) 52 to the generation circuit 60.

At step S104, the generation circuit 60 generates a reproduced signal RF0 in accordance with the amount of reflected light of the 0-th order diffraction light and the reproduced signals RF1 and RF2 in accordance with the amount of reflected lights of the ±1st order diffraction lights based on the output signals SAu, SAd, SBu, SBd, and SC to SF.

Also, the generation circuit 60 generates a push-pull signal PP0 based on the output signals SAu, SAd, SBu, and SBd, generates a push-pull signal PP1 based on the output signals SC and SD, and generates a push-pull signal PP2 based on the output signals SE and SF.

Also, the generation circuit 60 generates a tracking error signal TE as the differential push-pull signal based on the push-pull signals PP0 to PP2.

Also, the generation circuit 60 generates a cross track signal CT based on the push-pull signals PP1 and PP2.

At step S105, the tilt detection circuit 66 detects the magnitudes Sa and Sb of the amplitudes of the alternating current components of the reproduced signals RF1 and RF2 and detects the tilt or tilt angle of the optical disc 80 based on the difference between the related magnitudes Sa and Sb. Concretely, the tilt error signal TS corresponding to the tilt angle in the radial direction of the optical disc 80 is generated based on the difference (Sa−Sb or Sa/DCa−Sb/DCb) of the magnitudes Sa and Sb of the amplitudes of the alternating current components between the two reproduced signals RF1 and RF2.

Note that, the embodiment is an illustration of the present invention. The present invention is not limited to the embodiment.

As explained above, according to the present invention, there can be provided an error signal detection device and error signal detection method for detecting tracking error signals comprised by differential push-pull signals, an optical pick-up useable in the error signal detection device, and a diffraction grating useable in this optical pick-up.

Also, according to the present invention, it is possible to provide an error signal detection device and an error signal detection method for detecting tracking error signals comprised by differential push-pull signals and a tilt error signal.

While the invention has been described with reference to specific embodiments chosen for purpose of illustration, it should be apparent that numerous modifications could be made thereto by those skilled in the art without departing from the basic concept and scope of the invention.

What is claimed is:

1. A diffraction grating for generating a 0-th order diffraction light and ±1st order diffraction lights to be irradiated on a recording surface of an optical disc by diffracting a laser beam, wherein each of said ±1st order diffraction lights irradiated to said optical disc has a phase distribution equivalent or substantially equivalent to a wavefront aberration of said optical disc when there is a tilt in said optical disc, distances between a main optical spot corresponding to said 0-th order diffraction light and sub optical spots corresponding to said ±1st order diffraction lights in a disc radial direction at said recording surface are identical or substantially identical to a whole multiple of a pitch of tracks or track guide grooves of said optical disc, and a phase of a push-pull signal of said 0-th order diffraction light and a phase of a sum signal of the push-pull signals of said ±1st order diffraction lights are different from each other.

2. A diffraction grating as set forth in claim 1, wherein said main optical spot and said sub optical spots are formed on an identical track of said recording surface.

3. A diffraction grating as set forth in claim 1, wherein one of said ±1st order diffraction lights has a phase distribution equivalent or substantially equivalent to the wavefront aberration in a case when a tilt angle of said optical disc is a positive constant angle, and the other of said ±1st order diffraction lights has a phase distribution equivalent or substantially equivalent to the wavefront aberration in a case when the tilt angle of said optical disc is a negative constant angle.

4. A diffraction grating as set forth in claim 1, wherein said wavefront aberration is coma occurring at a transparent substrate of said optical disc.

5. A diffraction grating as set forth in claim 1, wherein said optical disc has an address region with pits indicating the address formed therein and a data region with lands and grooves formed therein, and said pits and said lands are arranged on the tracks of said recording surface.

6. An optical pick-up comprising:

a laser for outputting a laser beam, a diffraction grating for generating a 0-th order diffraction light and ±1st order diffraction lights by diffracting the laser beam from said laser, an object lens for focusing said 0-th order diffraction light and ±1st order diffraction lights and irradiating the same to the recording surface of the optical disc to form a main optical spot corresponding to said 0-th order diffraction light and sub optical spots corresponding to said ±1st order diffraction lights on said recording surface, and a photo detector provided with a main light receiving portion for receiving said 0-th order diffraction light reflected at said recording surface and sub light receiving portions for receiving said ±1st order diffraction lights reflected at said recording surface, wherein each of said ±1st order diffraction lights irradiated to said optical disc has a phase distribution equivalent or substantially equivalent to a wavefront aberration of said optical disc when there is a tilt in said optical disc, distances between the center of said main optical spot and centers of said sub optical spots in a disc radial direction on said recording surface are identical or substantially identical to a whole multiple of a pitch of tracks or track guide grooves, and the phase of a push-pull signal of said 0-th order diffraction light based on the output signal of said main light receiving portion and the phase of the sum signal of the push-pull signals of said ±1st order diffraction lights based on the output signals of said sub light receiving portions are different from each other.

7. An optical pick-up as set forth in claim 6, wherein said main optical spot and said sub optical spots are formed on the identical track of said recording surface.

8. An optical pick-up as set forth in claim 6, wherein one of said ±1st order diffraction lights has a phase distribution equivalent or substantially equivalent to the wavefront aberration when the tilt angle of said optical disc is a positive constant angle, and the other of said ±1st order diffraction lights has a phase distribution equivalent or substantially equivalent to the wavefront aberration when the tilt angle of said optical disc is a negative constant angle.

9. An optical pick-up as set forth in claim 6, wherein the wavefront aberration is coma occurring at a transparent substrate of said optical disc, and said main light receiving portion and sub light receiving portions are configured divided along a direction corresponding to the radial direction of said optical disc.

10. An optical pick-up as set forth in claim 6, wherein said optical disc has an address region with pits indicating the address formed therein and a data region with lands and grooves formed therein, and said pits and said lands are arranged on the track of said recording surface.

11. An error signal detection device comprising:

a laser for outputting a laser beam, a diffraction grating for generating a 0-th order diffraction light and ±1st order diffraction lights by diffracting the laser beam from said laser, an object lens for focusing said 0-th order diffraction light and ±1st order diffraction lights and irradiating the same to the recording surface of the optical disc to form a main optical spot corresponding to said 0-th order diffraction light and sub optical spots corresponding to said ±1st order diffraction lights on said recording surface, a photo detector provided with a main light receiving portion for receiving said 0-th order diffraction light reflected at said recording surface and sub light receiving portions for receiving said ±1st order diffraction lights reflected at said recording surface, and a generation circuit for generating a main push-pull signal corresponding to said 0-th order diffraction light and first and second sub push-pull signals corresponding to said ±1st order diffraction lights based on output signals of said photo detector and generating tracking error signals as differential push-pull signals obtained by subtracting a sum signal of said first and second push-pull signals from said main push-pull signal, wherein each of said ±1st order diffraction lights irradiated to said optical disc has a phase distribution equivalent or substantially equivalent to a wavefront aberration of said optical disc when there is a tilt in said optical disc, distances between the center of said main optical spot and centers of said sub optical spots in a disc radial direction on said recording surface are identical or substantially identical to a whole multiple of a pitch of tracks or track guide grooves, and the phase of said push-pull signal and the phase of the sum signal of said first and second sub push-pull signals are different from each other.

12. An error signal detection device as set forth in claim 11, wherein the device further has a tilt detection circuit for generating a tilt error signal corresponding to a tilt of said optical disc, said generation circuit generates a main reproduced signal corresponding to an amount of reflected light of said 0-th order diffraction light and first and second sub reproduced signals corresponding to amounts of reflected light of said ±1st order diffraction lights based on output signals of said photo detector, and said tilt detection circuit generates said tilt error signal based on a difference of amplitudes of alternating current components of said first and second sub reproduced signals.

13. An error signal detection device as set forth in claim 12, wherein said tilt detection circuit comprises:

a first high pass filter for extracting the alternating current component of said first sub reproduced signal, a first envelope detector for detecting the envelope of the signal extracted by said first high pass filter, a second high pass filter for extracting the alternating current component of said second sub reproduced signal, a second envelope detector for detecting the envelope of the signal extracted by said second high pass filter, and a subtractor for generating said tilt error signal based on a difference of amplitudes of output signals of said first and second envelope detectors.

14. An error signal detection device as set forth in claim 13, wherein said tilt detection circuit further has a first low pass filter for extracting a direct current component of said first sub reproduction signal, a first divider for dividing the amplitude of the output signal of said first envelope detector by the direct current component extracted by said first low pass filter, a second low pass filter for extracting the direct current component of said second sub reproduction signal, and a second divider for dividing the amplitude of the output signal of said second envelope detector by the direct current component extracted by said second low pass filter, and said subtractor generates said tilt error signal based on the difference of the output signals of said first and second dividers.

15. An error signal detection device as set forth in claim 12, wherein said optical disc has an address region with pits indicating an address formed therein and a data region with lands and grooves formed therein, said pits and said lands are arranged on the tracks of said recording surface, said generation circuit detects said tracking error signal of said data region, and said tilt detection circuit detects said tilt error signal of said address region.

16. An error signal detection device as set forth in claim 15, wherein the width of said lands and the width of said grooves are identical or substantially identical.

17. An error signal detection device as set forth in claim 11, wherein said generation circuit generates a cross track signal based on the difference between said first and second sub push-pull signals.

18. An error signal detection device as set forth in claim 11, wherein said main optical spot and said sub optical spots are formed on the identical track of said recording surface.

19. An error signal detection device as set forth in claim 11, wherein one of said ±1st order diffraction lights has a phase distribution equivalent or substantially equivalent to the wavefront aberration in the case when the tilt angle of said optical disc is a positive constant angle, and the other of said ±1st order diffraction lights has a phase distribution equivalent or substantially equivalent to the wavefront aberration in the case when the tilt angle of said optical disc is a negative constant angle.

20. An error signal detection device as set forth in claim 11, wherein
the wavefront aberration is coma occurring at the transparent substrate of said optical disc, and
said main light receiving portion and sub light receiving portions are configured divided along a direction corresponding to the radial direction of said optical disc.

21. An error signal detection method comprised of
a step of generating a 0-th order diffraction light and ±1st order diffraction lights by diffracting a laser beam and irradiating the generated 0-th order diffraction light and ±1st order diffraction lights to a track of a recording surface of the optical disc,
a step of generating a main push-pull signal corresponding to said 0-th order diffraction light reflected at said recording surface and first and second sub push-pull signals corresponding to said ±1st order diffraction lights reflected at said recording surface, and
a step of generating a tracking error signal as a differential push-pull signal obtained by subtracting a sum signal of said first and second sub push-pull signals from said main push-pull signal, wherein
each of said ±1st order diffraction lights irradiated to said optical disc has a phase distribution equivalent or substantially equivalent to a wavefront aberration of said optical disc when there is a tilt in said optical disc,
distances between the center of said main optical spot and centers of said sub optical spots in a disc radial direction on said recording surface are identical or substantially identical to a whole multiple of a pitch of tracks or track guide grooves, and
the phase of said push-pull signal and the phase of the sum signal of said first and second sub push-pull signals are different from each other.

22. An error signal detection method as set forth in claim 21, further comprising
a step of generating a main reproduced signal corresponding to an amount of reflected light of said 0-th order diffraction light reflected at said recording surface and first and second sub reproduced signals corresponding to amounts of reflected light of said ±1st order diffraction lights reflected at said recording surface and
a step of generating a tilt error signal corresponding to a tilt of said optical disc based on a difference of amplitudes of alternating current components of said first and second sub reproduced signals.

23. An error signal detection method as set forth in claim 21, wherein
said optical disc has an address region with pits indicating the address formed therein and a data region with lands and grooves formed therein,
said pits and said lands are arranged on tracks of said recording surface,
in the step of generating said tracking error signal, said tracking error signal of said data region is generated, and
in the step of generating said tilt error signal, said tilt error signal of said address region is generated.

24. An error signal detection method as set forth in claim 23, wherein the width of said lands and the width of said grooves are identical or substantially identical.

25. An error signal detection method as set forth in claim 21, further comprised by a step of generating a cross track signal based on a difference between said first and second sub push-pull signals.

26. An error signal detection method as set forth in claim 21, wherein, in said step of irradiation, the main optical spot corresponding to said 0-th order diffraction light and the sub optical spots corresponding to said ±1st order diffraction lights are formed on the identical track of said recording surface.

27. An error signal detection method as set forth in claim 21, wherein
one of said ±1st order diffraction lights has a phase distribution equivalent or substantially equivalent to the wavefront aberration when the tilt angle of said optical disc is a positive constant angle, and
the other of said ±1st order diffraction lights has a phase distribution equivalent or substantially equivalent to the wavefront aberration when the tilt angle of said optical disc is a negative constant angle.

* * * * *

UNITED STATES PATENT AND TRADEMARK OFFICE
CERTIFICATE OF CORRECTION

PATENT NO. : 6,781,930 B2
DATED : August 24, 2004
INVENTOR(S) : Fukumoto

It is certified that error appears in the above-identified patent and that said Letters Patent is hereby corrected as shown below:

Column 14,
Line 48, change "divided regions, 8Au, 8Ad, 8Bu, and BBd." to -- 8Au, 8Ad, 8Bu, and 8Bd. --.
Line 57, change "related region BAd." to -- related region 8Ad. --.
Line 59, change "related region SBu." to -- related region 8Bu. --.

Column 23,
Line 5, change "SBU, SBd, and Sc to SF." to -- SBu, SBd, and SC to SF. --.

Signed and Sealed this

Twenty-eighth Day of December, 2004

JON W. DUDAS
*Director of the United States Patent and Trademark Office*